United States Patent [19]

Matoba

[11] Patent Number: 5,611,069
[45] Date of Patent: Mar. 11, 1997

[54] DISK ARRAY APPARATUS WHICH PREDICTS ERRORS USING MIRROR DISKS THAT CAN BE ACCESSED IN PARALLEL

[75] Inventor: Tatsuo Matoba, Kawasaki-shi, Japan

[73] Assignee: Fujitsu Limited, Japan

[21] Appl. No.: 273,887

[22] Filed: Jul. 12, 1994

[30] Foreign Application Priority Data

Nov. 5, 1993 [JP] Japan .................................. 5-276317

[51] Int. Cl.$^6$ .............................. G06F 13/10; G06F 7/00
[52] U.S. Cl. ...................... 395/441; 395/498; 395/489; 395/181; 395/182.04
[58] Field of Search ...................... 395/441, 442, 395/488, 489, 497.04, 414, 415, 421.11, 182.02, 182.03, 182.04, 182.05, 181, 575, 495, 650; 371/10.2, 10.3

[56] References Cited

U.S. PATENT DOCUMENTS 5,321,826  6/1994  Ushiro ..................................... 395/441
5,392,244  2/1995  Jacobson et al. ........................ 395/441
5,455,934  10/1995  Holland et al. ......................... 395/441

FOREIGN PATENT DOCUMENTS 3271923  12/1991  Japan .
4279924  10/1992  Japan .

*Primary Examiner*—Jack B. Harvey
*Assistant Examiner*—Ario Etienne
*Attorney, Agent, or Firm*—Greer, Burns & Crain, Ltd.

[57] ABSTRACT

Even if a plurality of disk units in a disk array which operate in parallel simultaneously causes faults, a system can instantaneously cope with a processing request without losing the data. For this purpose, a mirror disk unit in which two disk units are provided as one set is used as a component element of the disk array. The two disk units of the mirror disk unit are allocated to the disk unit for the present use and the disk unit for spare. Data is written into both the presently used disk unit and the spare disk unit. Data is read out from the present use disk unit. The occurrence of a fault of the disk unit is judged and the allocation is switched from the present use disk unit to the spare disk unit. In an idle state, a simulation to check the disk array is executed and fault information is collected. RAID3 or RAID5 in which a parity is stored in the mirror disk construction can be also used. Further, the present use disk unit is not constructed as a mirror disk and when the fault is judged in the present use disk unit, the data is copied to the spare disk unit, thereby dynamically realizing a mirror disk construction.

28 Claims, 27 Drawing Sheets

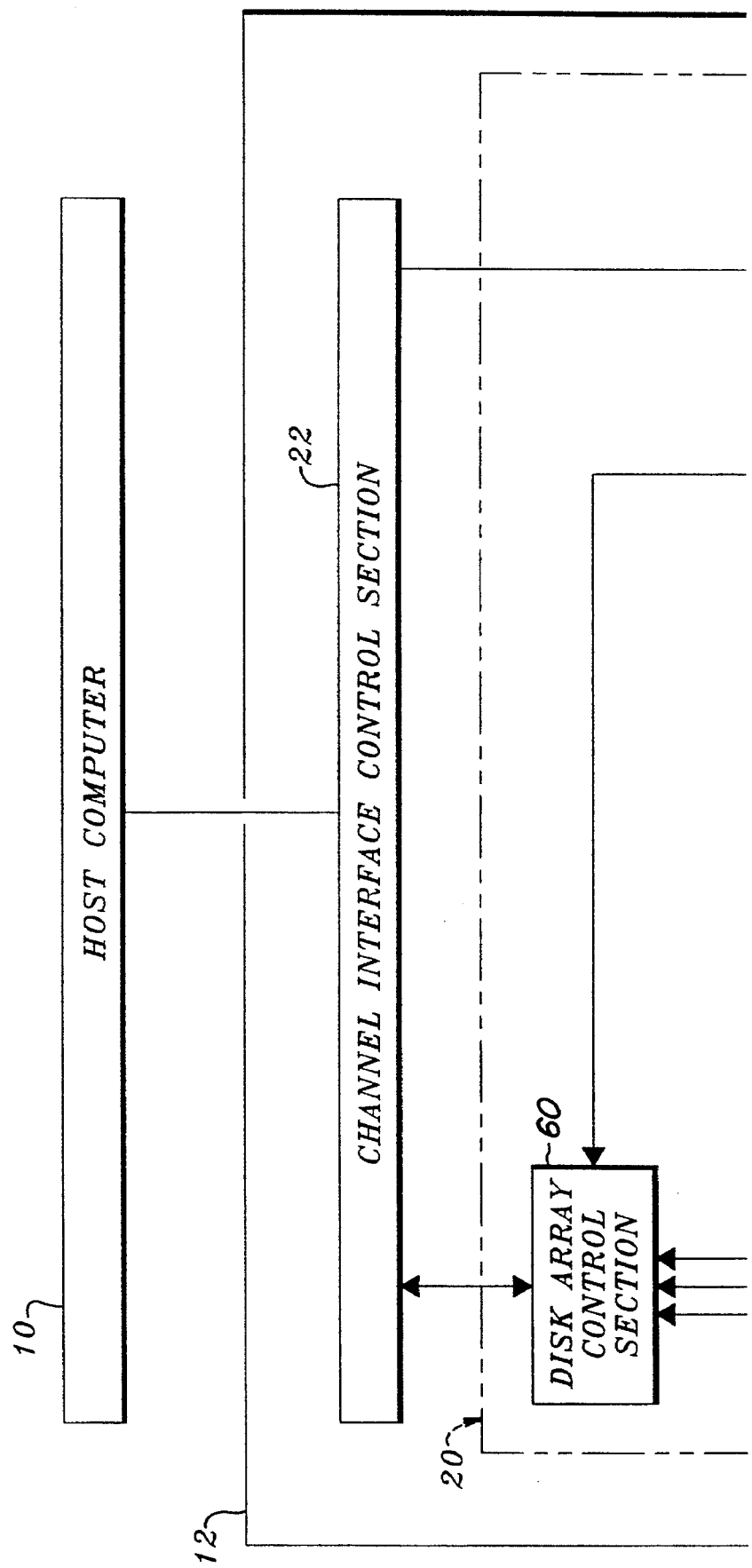

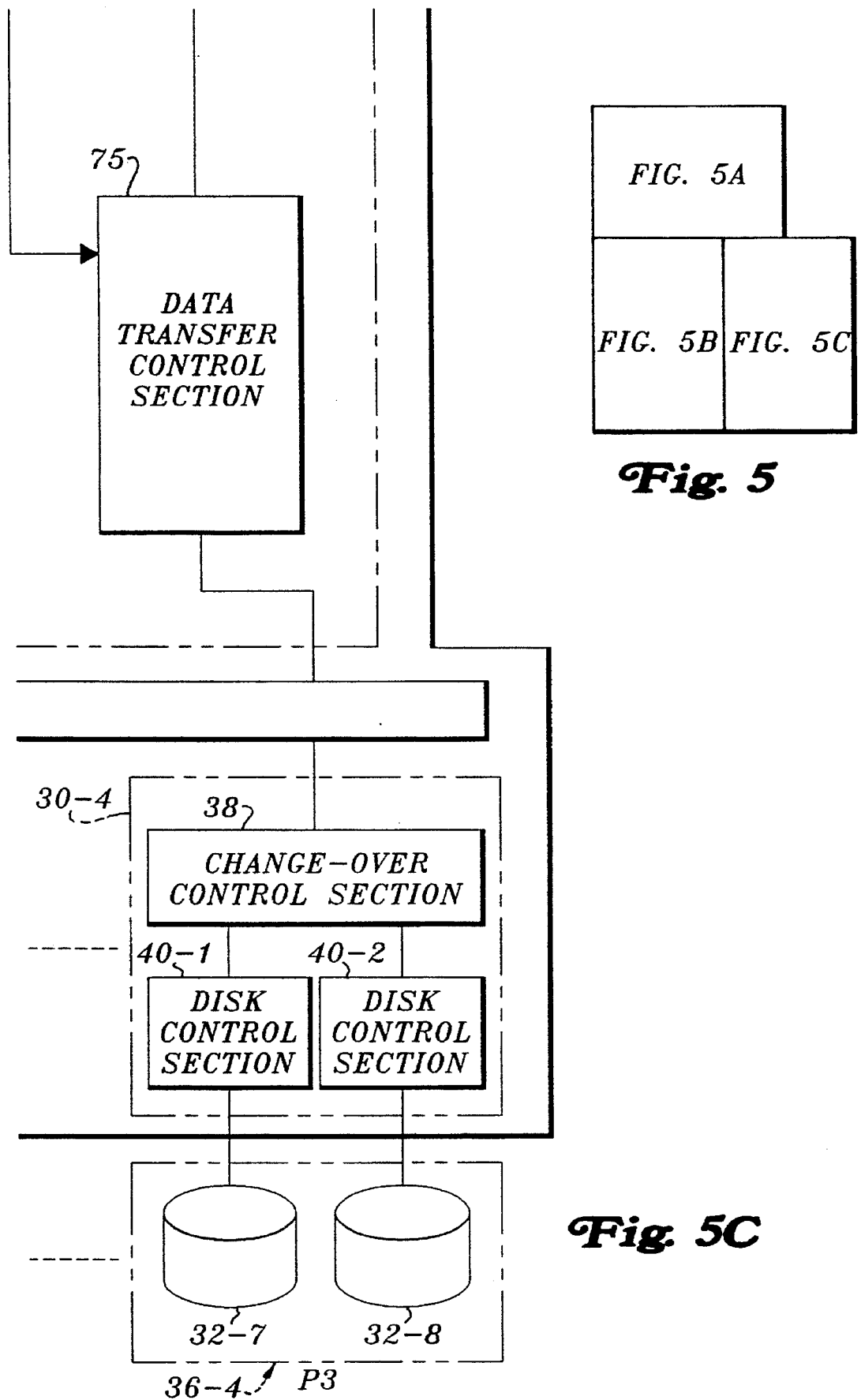

| MIRRORED ID | DEVICE ID | RANK | PORT | PRESENT USE FLAG | SPARE FLAG | THE NUMBER OF ABNORMALITY TIMES | FAILURE FLAG |
|---|---|---|---|---|---|---|---|
| 00 | 00 | 00 | 00 | 1 | 0 | 0 | 0 |
|    | 01 |    |    | 0 | 1 | 0 | 0 |
| 01 | 02 |    | 01 | 1 | 0 | 0 | 0 |
|    | 03 |    |    | 0 | 1 | 0 | 0 |
| 02 | 04 |    | 02 | 1 | 0 |   | 0 |
|    | 05 |    |    | 0 | 1 | 0 | 0 |
| 03 | 06 |    | 03 | 1 | 0 | 0 | 0 |
|    | 07 |    |    | 0 | 1 | 0 | 0 |
| 04 | 08 | 02 | 00 | 1 | 0 | 0 | 0 |
|    | 09 |    |    | 0 | 1 | 0 | 0 |
| 05 | 10 |    | 01 | 1 | 0 | 0 | 0 |
|    | 11 |    |    | 0 | 1 | 0 | 0 |
| 06 | 12 |    | 02 | 1 | 0 | 0 | 0 |
|    | 13 |    |    | 0 | 1 | 0 | 0 |

| MIRRORED ID | DEVICE ID | RANK | PORT | PRESENT USE FLAG | SPARE FLAG | THE NUMBER OF ABNORMALITY TIMES | FAILURE FLAG |
|---|---|---|---|---|---|---|---|
| 0 0 | 0 0 | 0 0 | 0 0 | 0 | 0 | 1 0 | 1 |
|  | 0 1 |  |  | 1 | 0 | 0 | 0 |
| 0 1 | 0 2 |  | 0 1 | 1 | 0 | 0 | 0 |
|  | 0 3 |  |  | 0 | 1 | 0 | 0 |
| 0 2 | 0 4 |  | 0 2 | 1 | 0 | 1 | 0 |
|  | 0 5 |  |  | 0 | 1 | 0 | 0 |
| 0 3 | 0 6 |  | 0 3 | 1 | 0 | 0 | 0 |
|  | 0 7 |  |  | 0 | 1 | 0 | 0 |
| 0 4 | 0 8 | 0 2 | 0 0 | 1 | 0 | 0 | 0 |
|  | 0 9 |  |  | 0 | 1 | 0 | 0 |
| 0 5 | 1 0 |  | 0 1 | 1 | 0 | 2 | 0 |
|  | 1 1 |  |  | 0 | 1 | 0 | 0 |
| 0 6 | 1 2 |  | 0 2 | 1 | 0 | 0 | 0 |
|  | 1 3 |  |  | 0 | 1 | 0 | 0 |

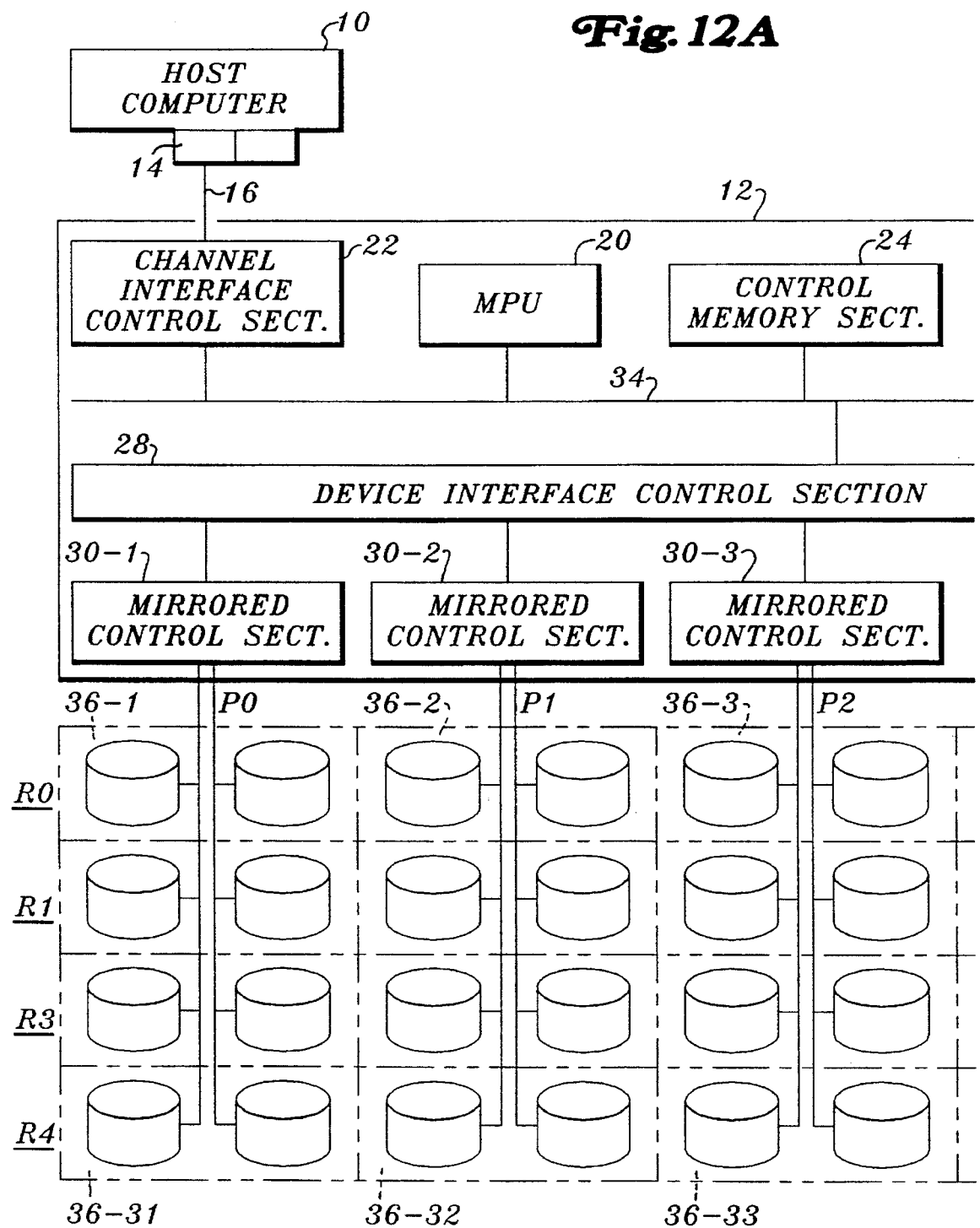

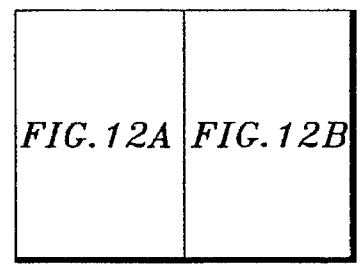
Fig. 12
Fig. 12B
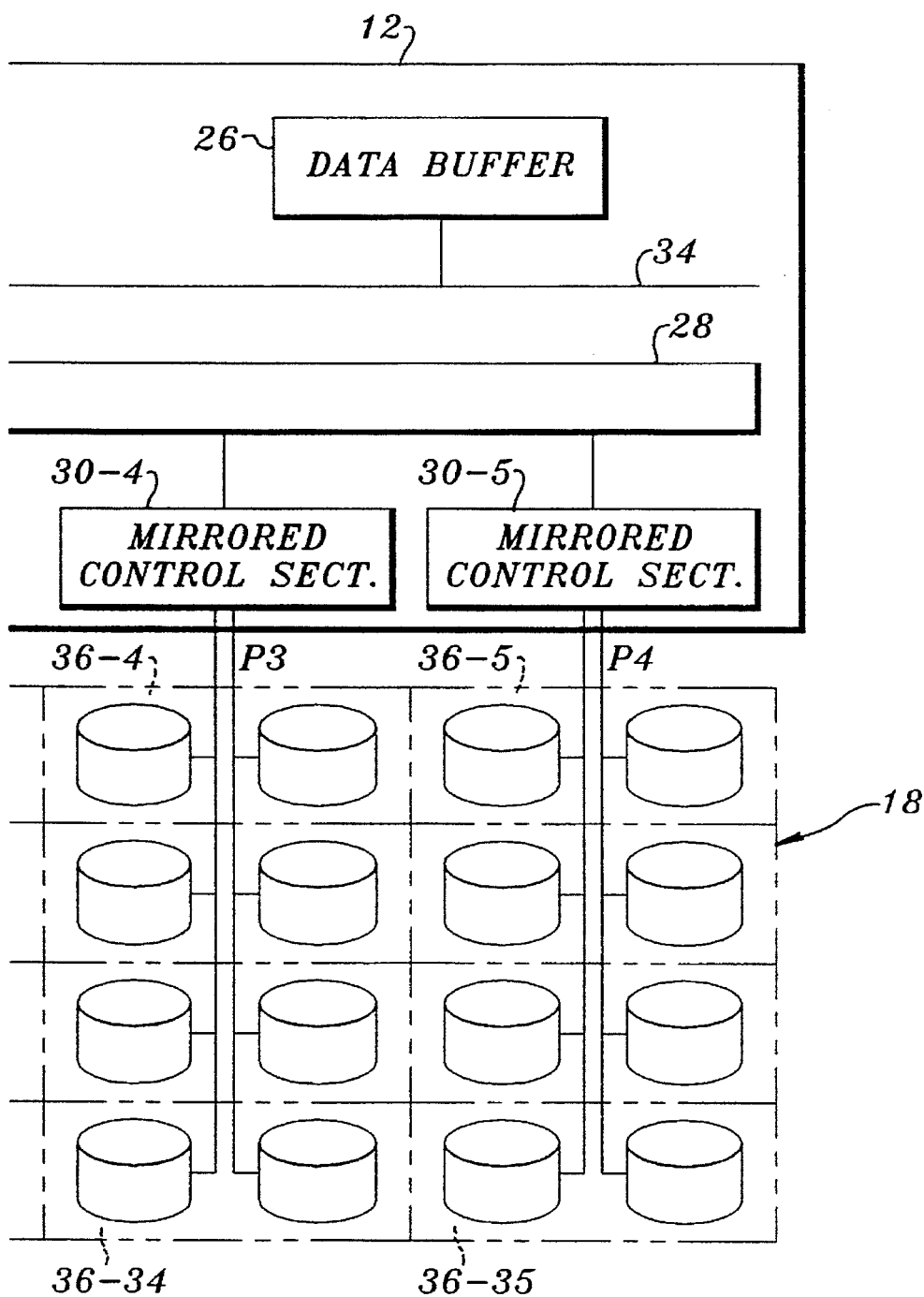

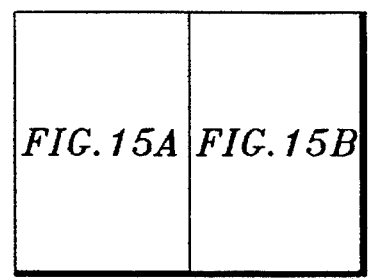
Fig. 15
Fig. 15B
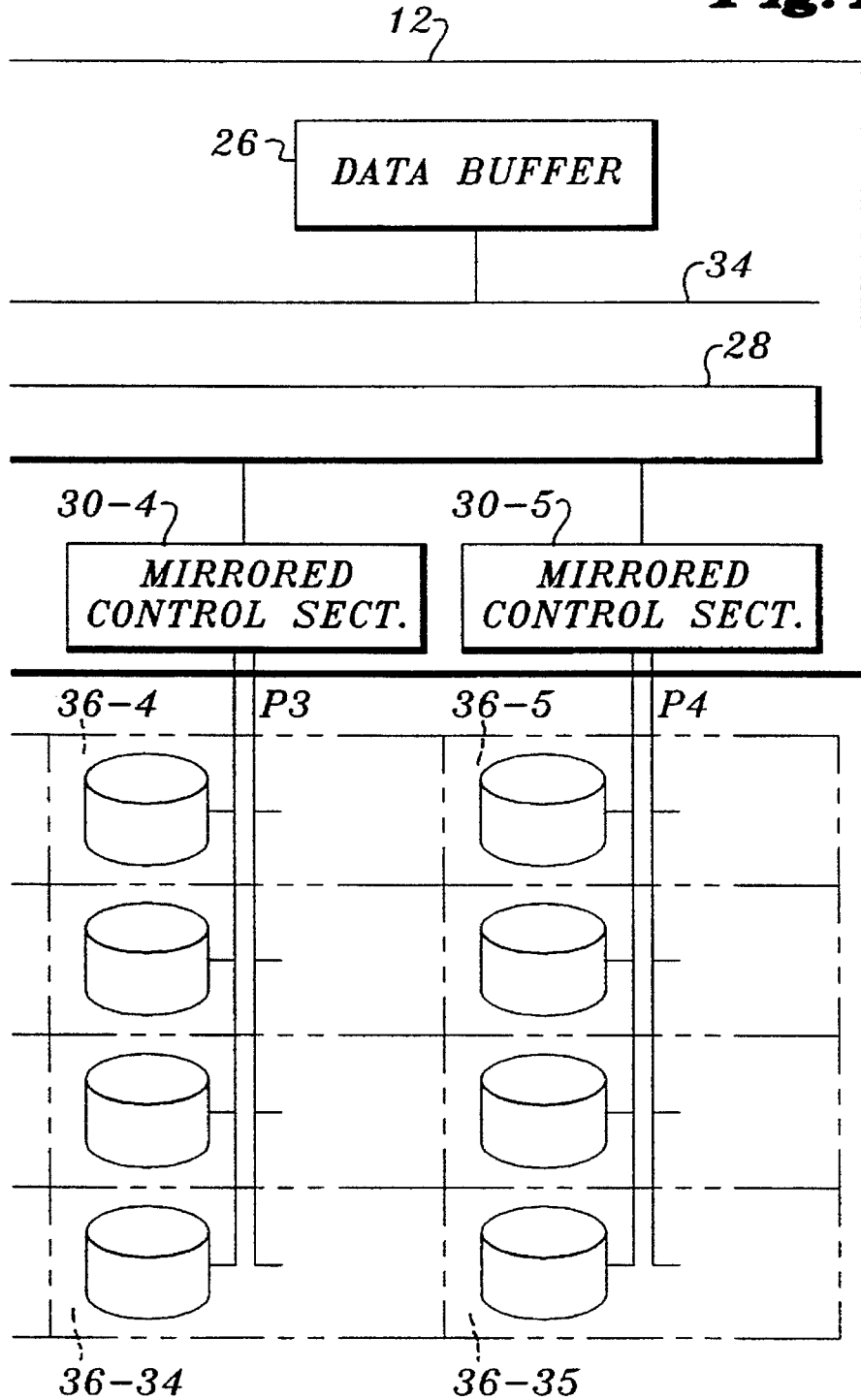

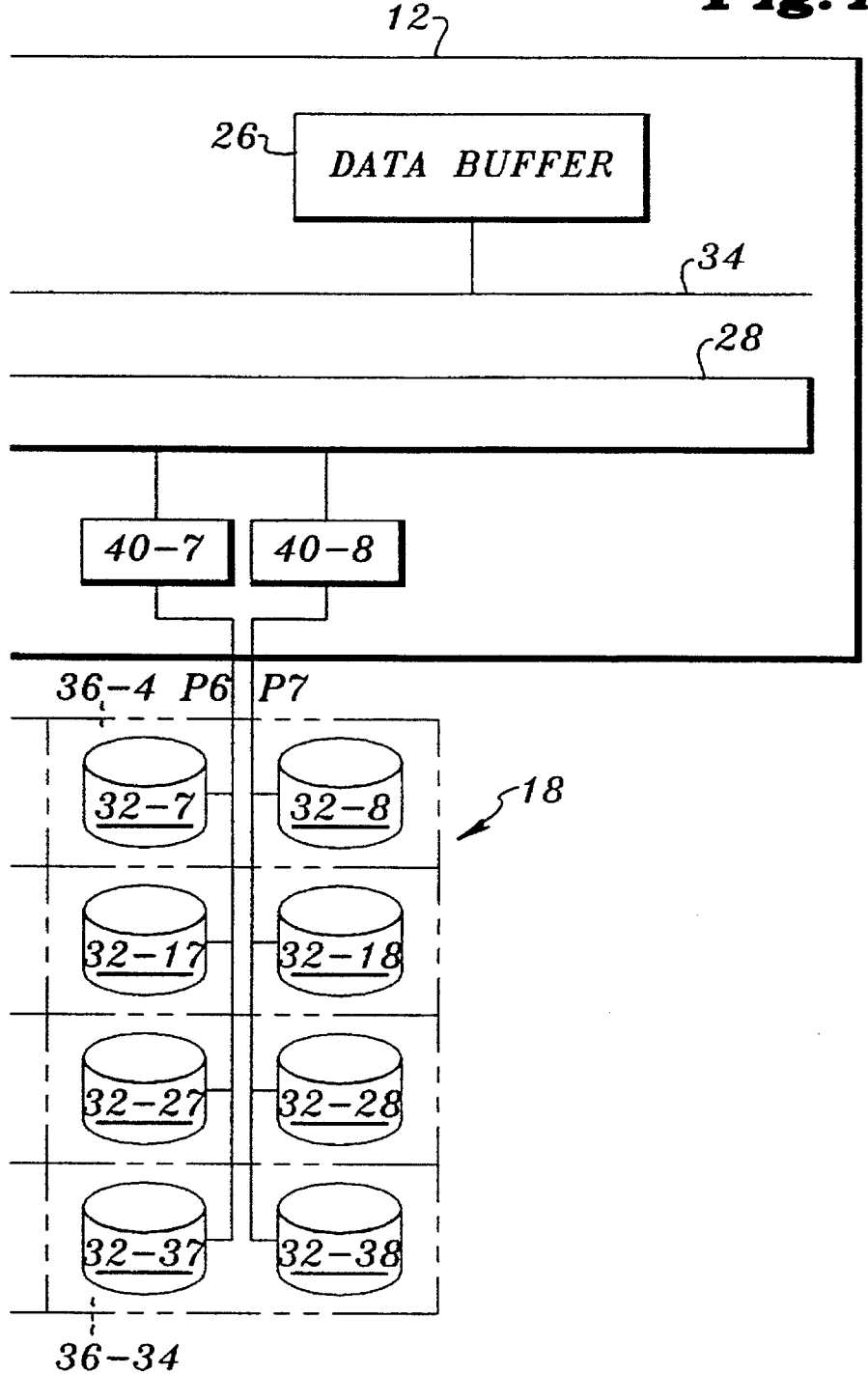

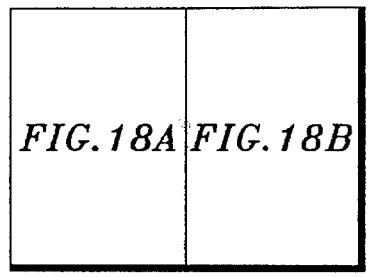
Fig. 18B
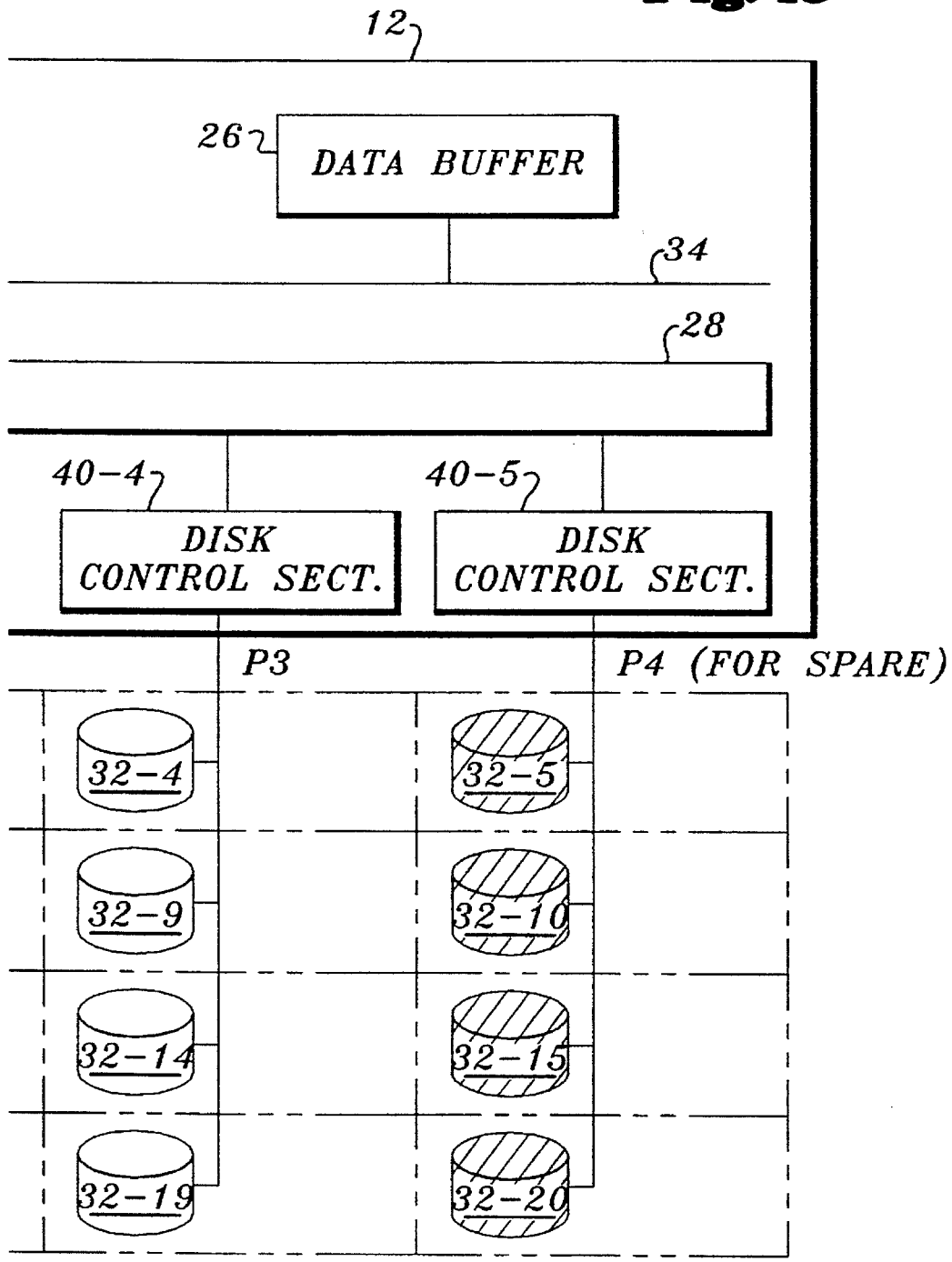

DISK ARRAY APPARATUS WHICH PREDICTS ERRORS USING MIRROR DISKS THAT CAN BE ACCESSED IN PARALLEL

BACKGROUND OF THE INVENTION

The invention relates to a disk array apparatus in which a plurality of disk units which are constructed in an array form are accessed in parallel on the basis of a command from an upper apparatus and, more particularly, to a disk array apparatus which can instantaneously reconstruct data even if a fault occurs in a disk unit.

In association with a request for high reliability in recent computer systems, the realization of a high reliability in input/output subsystems using a magnetic disk unit is required. To realize such a high reliability, a disk array apparatus in which data and redundant information are stored by making a plurality of disk units in parallel has been put into practical use. In the disk array apparatus, in the case where the data of one disk was lost due to a fault or the like, the lost data can be reconstructed into a spare disk unit which has been prepared as an alternate destination by using the data of the remaining disk units, so that a high reliability can be obtained. However, in the case where abnormalities simultaneously occur in a plurality of disk units in the disk array, the data cannot be reconstructed any more and the improvement in such a point is demanded.

In recent years, as an external memory device of a computer system, a disk unit such as magnetic disk unit, optical disc unit, or the like having features such as non-volatileness of the recording, large capacity, high data transfer speed, and the like has widely been used. As requirements for the disk unit, there are a high speed data transfer, a significance of the reliability, a large capacity, and low costs. An attention is paid to the disk array apparatus as an apparatus which satisfies those requirements. The disk array apparatus is an apparatus such that a few to tens of small disk units are arranged and data is distributed and recorded to a plurality of disk units and is accessed in parallel. In the disk array apparatus, by transferring the data to a plurality of disk units in parallel, the data can be transferred at a high speed that is higher than that in case of using one disk unit by the number of times corresponding to the number of disks. In addition to the data, by additionally recording redundant information such as parity data or the like, a data error which occurs due to a fault of the disk unit or the like can be detected and corrected. Thus, the significance of the reliability of a degree which is almost equivalent to that in case of using a method whereby the contents of the disk unit are recorded as double data can be realized by costs lower than those in the double data.

Hitherto, David A. Patterson et al. of University of California at Berkeley have proposed a paper in which, with respect to the disk array apparatus which accesses a large amount of data to many disks at a high speed and realizes redundancy of the data when a fault occurs in the disk, the disk array apparatus is classified into five levels 1 to 5 and is evaluated (ACMSIGMOD Conference, Chicago, Ill., pages 109 to 116, Jun. 1 to 3, 1988). The levels 1 to 5 to classify the disk array apparatus which have been proposed by David A. Patterson et al. are abbreviated to RAID (Redundant Arrays of Inexpensive Disks) 1 to 5. RAID1 to RAID5 will now be briefly described hereinbelow.

[RAID0]

Disk array apparatus having no redundancy of data. Although such a disk array apparatus is not included in the classification by David A. Patterson et al., it is temporarily called RAID0.

[RAID1]

Mirror disk unit in which two disk units are constructed as one set and the same data is written into them. Although a use efficiency of the disk units is low, since the mirror disk unit has a redundancy and can be realized by a simple control, it is widely spread.

[RAID2]

Data is striped (divided) on a bit or byte unit basis and the stripe data is read out or written from/into disk units in parallel. The stripe data is physically recorded into the same sector for all of the disk units. In addition to the disk units for data, the apparatus has a disk unit to record a Hamming code. The failed disk unit is identified from the Hamming code and data is reconstructed. However, such an apparatus is not put into practical use.

[RAID3]

Data is striped on a bit or byte unit basis, a parity is calculated, and the data and parity are written in parallel into disk units. RAID3 is effective in case of continuously handling a large amount of data. However, in the case such as a transaction process in which a small amount of data is accessed at random, a high data transfer speed cannot be effected and a use efficiency of the disk units deteriorates.

[RAID4]

One data is striped on a sector unit basis and the stripe data is written into the same disk unit. A parity is stored in a fixedly determined disk unit. When data is written, the data before writing and the parity are read out and, after that, a new parity is calculated and the data is written. Therefore, the accessing operations of total four times are needed with respect to one writing operation. On the other hand, since an access to the disk unit for parity certainly occurs when writing, the writing operations to a plurality of disk units cannot be simultaneously executed. However, although RAID4 has been defined, it is not yet put into practical use at present because there is hardly a merit.

[RAID5]

Since the disk unit for parity is not limited, the reading/writing operations can be executed in parallel. That is, the disk unit into which a parity is set differs every sector. So long as the parity disks don't overlap, the sector data can be written into different disk units in parallel. As mentioned above, in RAID5, since the reading or writing operation can be executed by asynchronously accessing to a plurality of disk units, RAID5 is suitable for the transaction process such that a small amount of data is accessed at random.

In the disk array apparatus having the operation forms of RAID3 and RAID5 which are at present being put into practical use, for example, a spare disk unit is prepared every rank constructing one parity group. In the case where one disk unit fails, the data of another normal disk unit is read out and the data of the failed disk unit is reconstructed into the spare disk unit. Therefore, even if the data is lost by a fault of the disk unit, it can be reconstructed, so that an extremely high reliability can be obtained. There is, however, a problem such that in the case where a fault simultaneously occurs in two or more disk units and the data is lost, the lost data cannot be reconstructed from the remaining normal disk unit but a system down occurs.

SUMMARY OF THE INVENTION

According to the present invention, there is provided a disk array apparatus which can instantaneously cope with a processing requirement without losing any data even when a fault simultaneously occurs in two or more disk units which are operating in parallel.

According to the invention, a plurality of mirror disk sections are arranged so that they can be accessed in parallel by a pair of disk units to store the same data, thereby constructing a disk array section. After write data from an upper apparatus was striped, a control section writes the stripe data in parallel into the disk array section. The control section synthesizes the data which was read out in parallel from the disk array section and transfers the synthesized data to the upper apparatus. States of a plurality of disk units provided in the disk array section are managed by a device management table section. When there is an access request from the upper apparatus, the control section executes processes to the disk array section with reference to the device management table section. For example, information indicating that one of the disk units provided in the mirror disk section is set to the disk unit for the present use and the other is set to the disk unit for spare use is registered into the device management table section. In this case, at the time of a read access, the control section reads out the data from the disk unit for the present use in the mirror disk section with reference to the device management table section. At the time of a write access the control section writes the data into both the disk unit for present use and the spare disk unit. The switching operation between the present use disk unit and the spare disk unit in the mirror disk section is executed by a switching control section of the disk array section. The switching control section switches the disk unit to the disk unit on the present use side in the mirror disk section in response to an instruction of the reading operation from the control section and reads out the data. On the other hand, in response to an instruction of the writing operation, the switching control section switches the disk unit so as to write the data into both of the present use disk unit and the spare disk unit.

As a modification of the invention, it is also possible to construct a disk array section such that, in place of providing the switching control section, a pair of disk units constructing the mirror disk section are connected in parallel to the control section through individual ports. In this case, in the reading operation, the control section reads out the data by accessing to the disk unit on the present use side by one port of the mirror disk section. In the writing operation, the control section writes the data by accessing both the present use disk unit and the spare disk unit by both ports. As a data striping when there is a write request from the upper apparatus, the control section stripes the write data on the basis of the number of disk units in the mirror disk section which are accessed in parallel. After that, the same data as each stripe data is formed. As mentioned above, by transferring the mirrored stripe data (a pair of same data) to two ports every mirror disk section, the same data can be written.

According to such a disk array apparatus of the invention, the component elements of the disk array apparatus are formed as a mirror disk construction such that a pair of disk units are constructed as one set and the same data is stored therein. With such a mirror disk construction, the apparatus can instantaneously cope with the loss of data due to a fault of either one of the disk units without needing redundant information. An extremely high reliability can be assured.

On the other hand, in case of a disk array section comprising a mirror disk section as a component element, the costs increase and an installation space also increases. To solve the above drawbacks, the following installing structure is used. First, the disk array section is constructed by: a disk unit having therein at least a pair of detachable disk modules; and an apparatus casing having an enclosing structure which can install a plurality of disk units in accordance with a predetermined array construction. The disk unit has a power source section and a cooling section as a common portion for the detachable disk module. The disk module has at least a disk medium, a disk rotating mechanism, and a head mechanism. Further, the disk unit has therein a circuit unit of a switching control section for switching in a manner such that the disk unit is switched to the disk unit for the present use in the mirror disk section in response to an instruction of the reading operation from the control section and the data is read out and, in response to an instruction of the writing operation, the data is written into both of the present use disk unit and the spare disk unit.

As mentioned above, two disk modules can be detachably installed to one disk unit, so that even in the array construction by the installation of one disk module, ordinarily, by merely additionally installing one remaining disk module, the apparatus can be easily changed to the mirror disk construction. On the other hand, by installing a disk module of the invention to a disk array casing into which another disk unit having therein a single disk module of a different medium size will be enclosed, a disk array comprising a mirror disk section as a component element can be easily realized. For example, the disk unit which can install two disk modules of 3.5 inches is set to the same unit as the disk unit having one existing disk module of 5 inches. Due to this, by exchanging the disk array using the disk unit of 5 inches to the disk unit having two disk modules of 3.5 inches, a disk array apparatus of the invention with a mirrored structure can be easily constructed.

Further, according to the invention, there is provided a disk array apparatus in which the occurrence of a fault can be prevented by previously switching the operating mode to a fault countermeasure state in the case where the error state of the disk unit is monitored and a possibility of the occurrence of a fault rises. That is, in association with the mirrored structure of the array components of the invention, it is necessary to know the fault of the disk unit and to cope with such a fault as quickly as possible in order to further raise the reliability. Therefore, an access judging section discriminates whether an abnormality has occurred in a check circuit section for the execution of the access to the disk array section or not. The number of abnormalities which were judged in the access judging section is counted by an abnormality number counter section. When such a number is equal to or larger than a predetermined threshold value, a fault judging section judges a device fault and fault information is registered into a device management table section. Preventive maintenance information formed in correspondence to the abnormality judgment of the access judging section is held by a preventive maintenance information storing section into a state in which it can be recognized by the upper apparatus, thereby enabling the state of the disk array to be recognized by the upper side.

As mentioned above, one of the mirror disks is allocated to the disk for present use, the other is allocated to the disk for spare use, and ordinarily, the data is written into both of disk for present use and the spare disk and the data is read out from the present use disk. However, the count value of the number of occurring times of abnormalities such as seek error, read error, write error, and the like which is statistically obtained is checked. When the number of errors of the present use disk unit exceeds a predetermined threshold value, it is judged that a possibility of a fault is high. Due to this, the allocation to disk for present use and the spare disk can be switched before a fault occurs. Therefore, even in the case where disk for present use actually causes a fault, since the allocation to the spare disk has already been switched, the spare disk unit fails and the apparatus can cope with a fault without particularly substantially interrupting the processes for the read access. On the other hand, since the fault judgment result is always held in the upper apparatus as preventive maintenance information so that it can be referred to a fault situation of the disk array can output and display on the upper apparatus side. The operator or maintenance person can promptly and properly execute a maintenance work for the disk unit in which the fault was judged.

Further, in an empty state (idle state) of the control section, a false accessing operation, namely, simulation is executed to the disk array section by a device checking section, thereby examining a state of each disk unit. For example, the device checking section executes a false writing operation using dummy data to a specific data region (CE region) of the disk array section. When the access judging section detects an abnormality by such a false accessing operation to the disk array section, an abnormality number counter section counts the number of abnormality times each time the abnormality is detected. When a fault judging section judges that the number of abnormalities exceeds a predetermined threshold value, fault information is registered into a device management table section as a fault device. Further, there is provided a preventive maintenance information storing section for forming preventive maintenance information on the basis of the abnormality information which was judged by the access judging section by the false access by the device checking section and for holding the preventive maintenance information into a state in which it can be recognized by the upper apparatus. In a state in which the fault information has been registered in the device management table, in the case where the fault disk unit is recognized by referring to the fault information of the device management table section upon execution of the reading operation, the control section switches the operating mode to the reading operation from the spare disk when the fault disk unit is the disk unit on the present use side. When the fault disk unit is the disk unit for spare, the control section maintains the reading operation from the present use disk. In the case where the fault disk unit is recognized with reference to the fault information of the device management table section upon execution of the writing operation, the control section disconnects the fault disk unit from the target of the writing operation. The switching of the fault disk unit can be also realized by changing the ID information indicative of the present use disk and the spare disk in association with the registration of the fault information into the device management table. It is also possible to construct in a manner such that the control apparatus side executes the checking process by the write simulation for the state of the disk array by using the idle state in which there is no access from the upper apparatus and the state of the disk unit is positively examined and the disk unit having a possibility of fault is promptly recognized and the apparatus can cope with such a fault.

Further, according to the invention, array elements are constructed by a mirror disk section and redundant information is also stored and the reliability in which the realization of the mirrored construction and the redundancy are compounded is further improved. That is, the control section stripes the write data from the upper apparatus and writes the stripe data into the disk array section in parallel together with the parity data and synthesizes the data which was read out in parallel from the disk array section and transfers the synthesized data to the upper apparatus. For example, it is sufficient to use the operation form of RAID3 or RAID5 in which the parity is mirrored and stored.

Further, although the invention ordinarily functions as a disk array having simple parallel disk units, in the case where it is predicted and judged that there is a possibility such that a fault occurs in one of the disk units, the formation of the mirrored construction with the spare disk unit is dynamically performed, thereby enabling the switching to the spare side to be instantaneously executed when a fault actually occurs in the disk. Therefore, the control section allocates at least one disk unit which belongs to the same rank in the disk array section to the spare disk and allocates the other plurality of disk units for the disks for storage of data. The write data from the upper apparatus is striped and the stripe data is written in parallel into the disk units for data storage. The data read out in parallel from the disk units for data storage is synthesized and transferred to the upper apparatus. Further, the number of abnormalities of the data storage disk units which were judged in the access judging section is counted by the abnormality number counter section. When the result of the counting is equal to or larger than a predetermined value that is smaller than a threshold value which is used in the ordinary fault judgment, the fault judging section predicts and discriminates that a fault will occur in near future. When the fault judging section predicts and judges the fault, the spare disk unit is selected and mirrored by a construction control section. That is, the fault is predicted and judged like a pre-alarm in a state before the number of abnormalities reaches the value such that the occurrence of fault is judged. When the fault is decided, the construction control section copies the storage data of the disk unit in which the fault was decided into the spare disk unit. After completion of the copy, a new mirror disk section is formed by the fault decision disk unit and the copied spare disk unit. That is, the construction control section sets the operation to simultaneously write the data into both of the disk units of the new mirror disk section and the operation to read out the data from either one of the disk units for the control section. In this case, the construction control section sets the spare disk unit into the present use disk, thereby allowing the control section to read out the data. In order to promote the repair and exchange of the fault decision disk unit, the fault judging section generates and displays a fact that the predictive judgment of the fault has been performed to the outside.

As mentioned above, although the mere parallel accessing operations are ordinarily executed, by using a dynamic mirrored construction which switches to the mirror disk construction slightly before the fault is judged, the data copy between the disk units is executed at a stage earlier than the ordinary fault judgment, so that a situation such that the copy is impossible due to the fault of the disk unit can be avoided as possible. It is desirable to perform such a pre-alarm like fault judgment at a fairly early stage such as a timing corresponding to the half of the threshold value in the ordinary fault judgment. On the other hand, in the case where the fault is decided, the copy of the data to the spare disk unit is performed in the idle state. Therefore, no influence is exerted on the reading and writing operations by the control section. By the dynamic mirrored construction when the fault is predicted and judged, a disk array of a substantial mirror disk construction can be realized by the necessary minimum limit disk units.

The above and other objects, features, and advantages of the present invention will become more apparent from the following detailed description with reference to the drawings.

BRIEF DESCRIPTION OF THE DRAWINGS

FIG. 6 is an explanatory diagram of a device management table which is used in the invention;

FIG. 7 is an explanatory diagram of a device management table in the case where a disk fault is predictively judged;

FIG. 12 is divided into two sections, 12A and 12B, and is a block diagram showing another embodiment of the invention to store a parity in a mirror disk construction;

DETAILED DESCRIPTION OF THE PREFERRED EMBODIMENTS

Figure 1A:
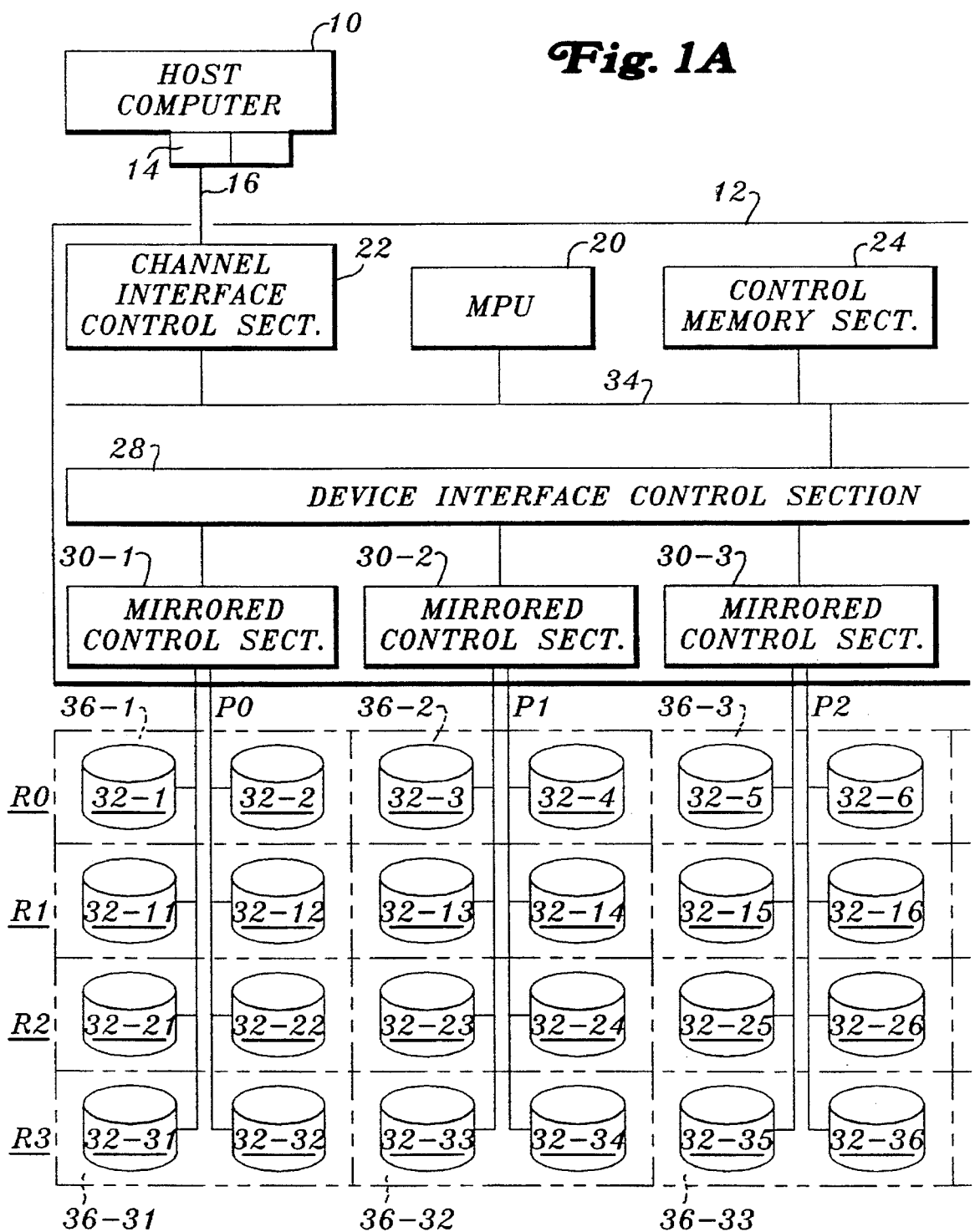
FIG. 1 is divided into two sections, 1A and 1B, and is a block diagram showing a hardware construction of the present invention.
Figure 1B:
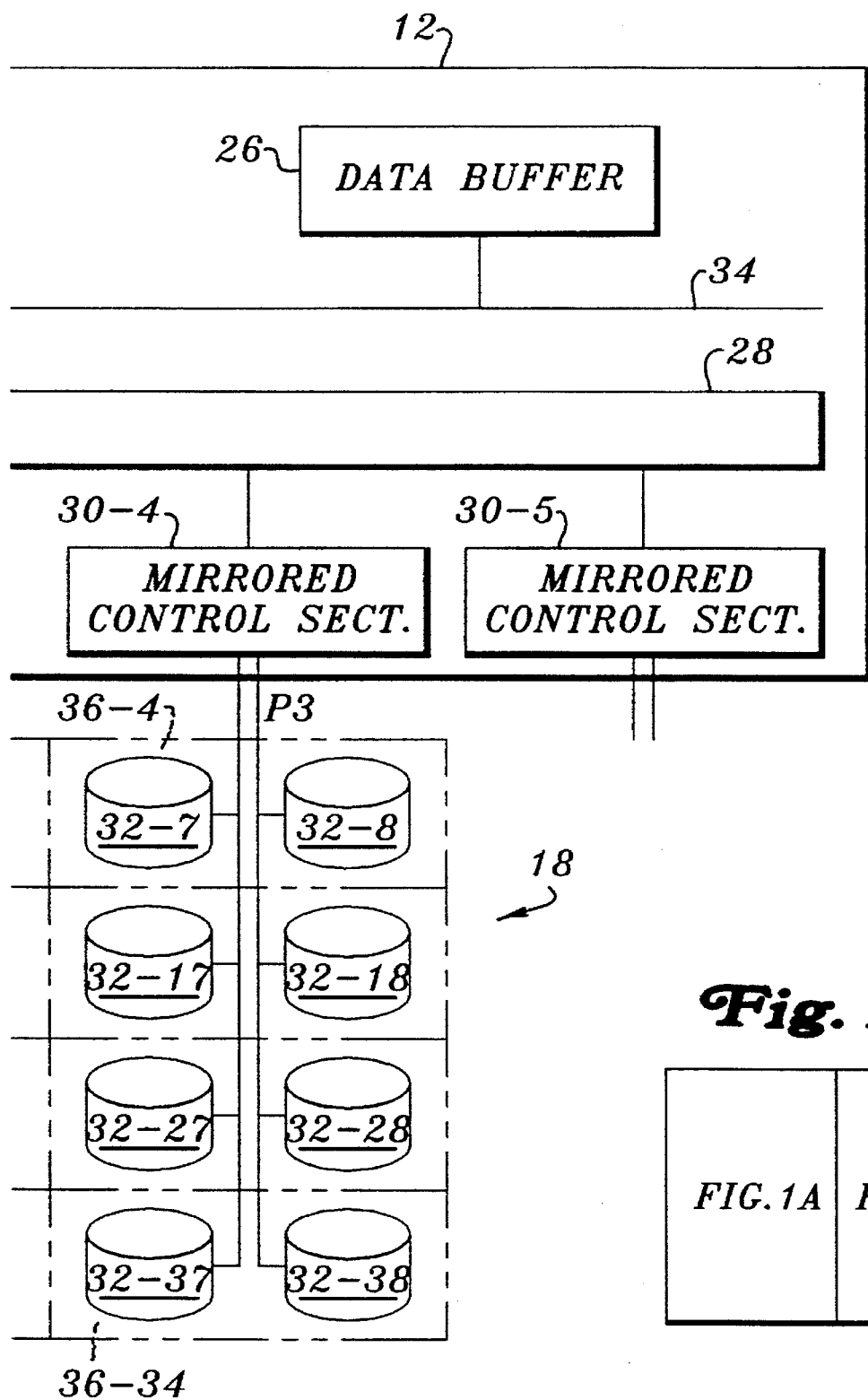
Figure 1:
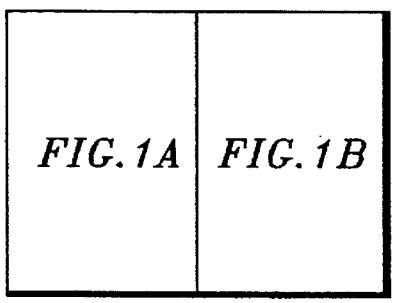

FIG. 1 shows a hardware construction of an input/output subsystem of a computer to which a disk array apparatus of the invention is applied. A channel apparatus 14 is provided for a host computer 10 as an upper apparatus. A controller 12 is connected to the channel apparatus 14 through a channel interface bus 16. A BMCI (Block Multiplexer Channel Interface) or SCSI (Small Computer System Interface) can be used as a channel interface bus 16. A disk array 18 is connected as an input/output device to the controller 12. The disk array 18 has a construction comprising: ports P0 to P3 which indicate the number of parallel accesses and are arranged in the lateral direction; and ranks R0 to R3 in which the array of P0 to P3 in the lateral direction is constructed as multi stages in the vertical direction. In the invention, mirror disk units 36-1 to 36-4 are arranged as component elements of the disk array at the positions which are determined by the ports P0 to P3 and the ranks R0 to R3. When considering the mirror disk unit 36-1 of the port No. P0 and the rank No. R0, for example, among the mirror disk units 36-1 to 36-4, two disk units 32-1 and 32-2 are connected and each of them is connected to a device bus from a mirrored control section 30-1 provided on the controller 12 side. Each of the other mirror disk units 36-2 to 36-34 has substantially the same construction as such a construction of the mirror disk unit 36-1. The mirror disk unit 36-1 is subjected to the writing of the same data by the controller 12. Therefore, the same data is always stored in the disk units 32-1 and 32-2. It is sufficient to read out the data from either one of the disk units 32-1 and 32-2. According to the invention, in the controller 12, the disk unit 32-1 on the left side of the mirror disk unit 36-1 has previously been allocated to the disk unit for the present use and the disk unit 32-2 on the right side has previously been allocated to the disk unit for spare. Therefore, although the data is written to both of the present use disk unit 32-1 and the spare disk unit 32-2, the data is read out from only the present use disk unit 32-1. The controller 12 has an MPU 20. A channel interface control section 22, a control memory section 24, a data buffer 26, and a device interface control section 28 are connected to an internal bus 34 of the MPU 20. As will be obviously explained hereinlater, the MPU 20 executes the processing operation based on a request from the host computer 10 which processes mirror disk unit groups of the disk array 18 as targets in accordance with a program control. The disk array 18 side is shown on the assumption that the disk units are installed with respect to four ports P0 to P3. The disk unit is in an idle state with respect to a mirrored control section 30-5.

Figure 2:
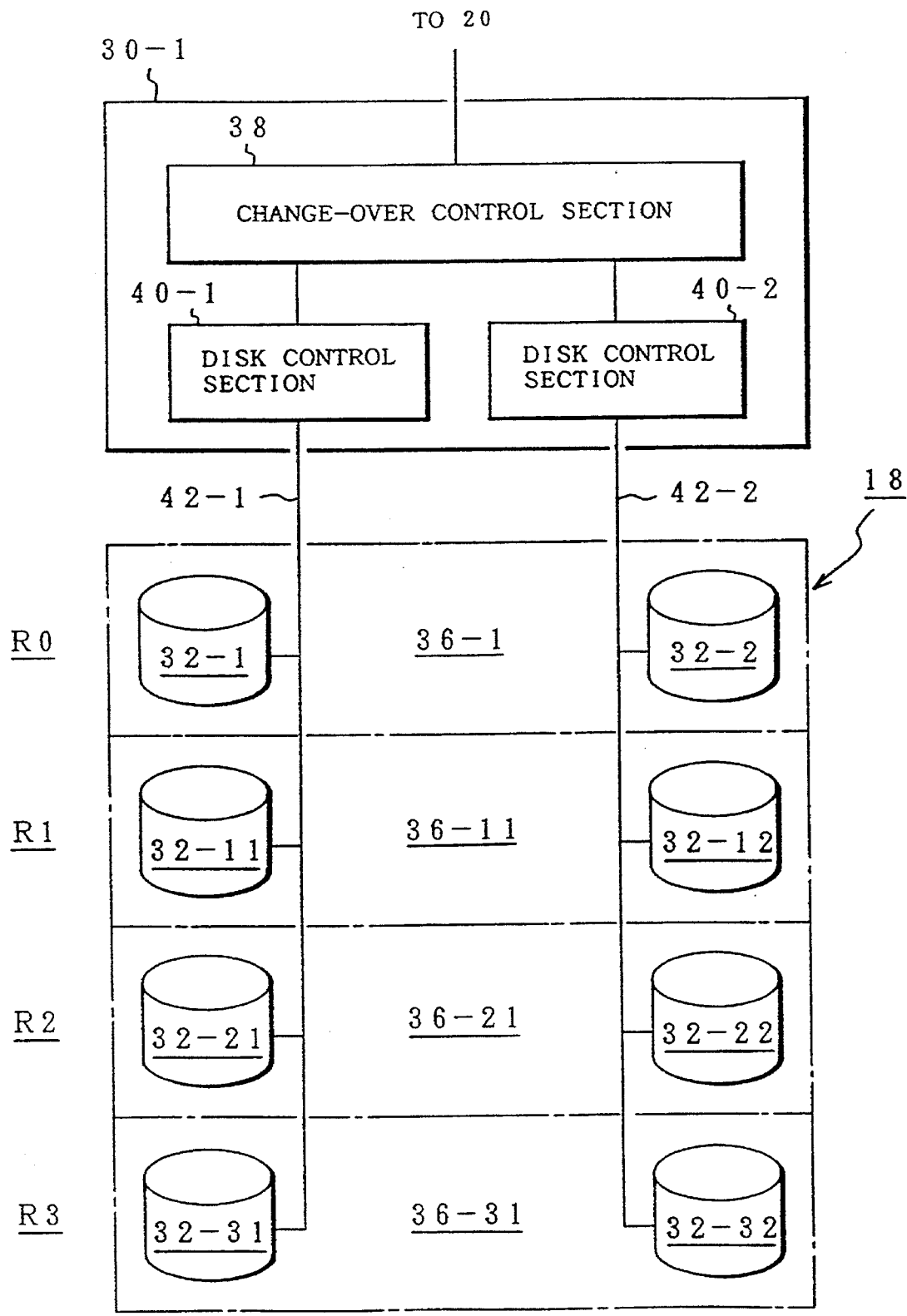
FIG. 2 is a block diagram of a mirrored control section in FIG. 1.

FIG. 2 shows the details of the mirrored control section 30-1 provided in the controller 12 in FIG. 1 together with the disk array side. A change-over control section 38 and disk control sections 40-1 and 40-2 are provided for the mirrored control section 30-1 provided on the controller 12 side. Device interface buses 42-1 and 42-2 are led out from the disk control sections 40-1 and 40-2, respectively. In the embodiment, each of the mirror disk units 36-1 to 36-31 is constructed by two magnetic disk units. Every two magnetic disk units are connected per rank. The change-over control section 38 executes a switching process according to the allocation of the operating modes of the mirror disk units which have been preset on the MPU 20 side, namely, according to the allocation to the present use disk and the allocation to the spare disk. It is now assumed that the disk control section 40-1 side has been allocated to the present use disk and the disk control section 40-2 side has been allocated to the spare disk. In this case, in response to an instruction of the writing operation from the MPU 20, the writing operation command is supplied to both of the disk control sections 40-1 and 40-2. The disk control sections 40-1 and 40-2 executes the writing operations to the disk units 32-1 and 32-2 in the mirror disk unit 36-1 of, for instance, the rank R0 which is specified by a device ID that is simultaneously designated. On the other hand, in the case where the reading operation is instructed from the MPU 20 side, the apparatus is switched to only the disk control section 40-1 side for the present use disk, thereby executing the reading operation from the disk unit 32-1 on the present use side of, for example, the mirror disk unit 36-1 corresponding to the designated device ID. Each of the remaining mirrored control sections 30-2 to 30-5 shown in FIG. 1 also has a construction similar to such a construction of the mirrored control section 30-1 shown in FIG. 2.

Figure 3:
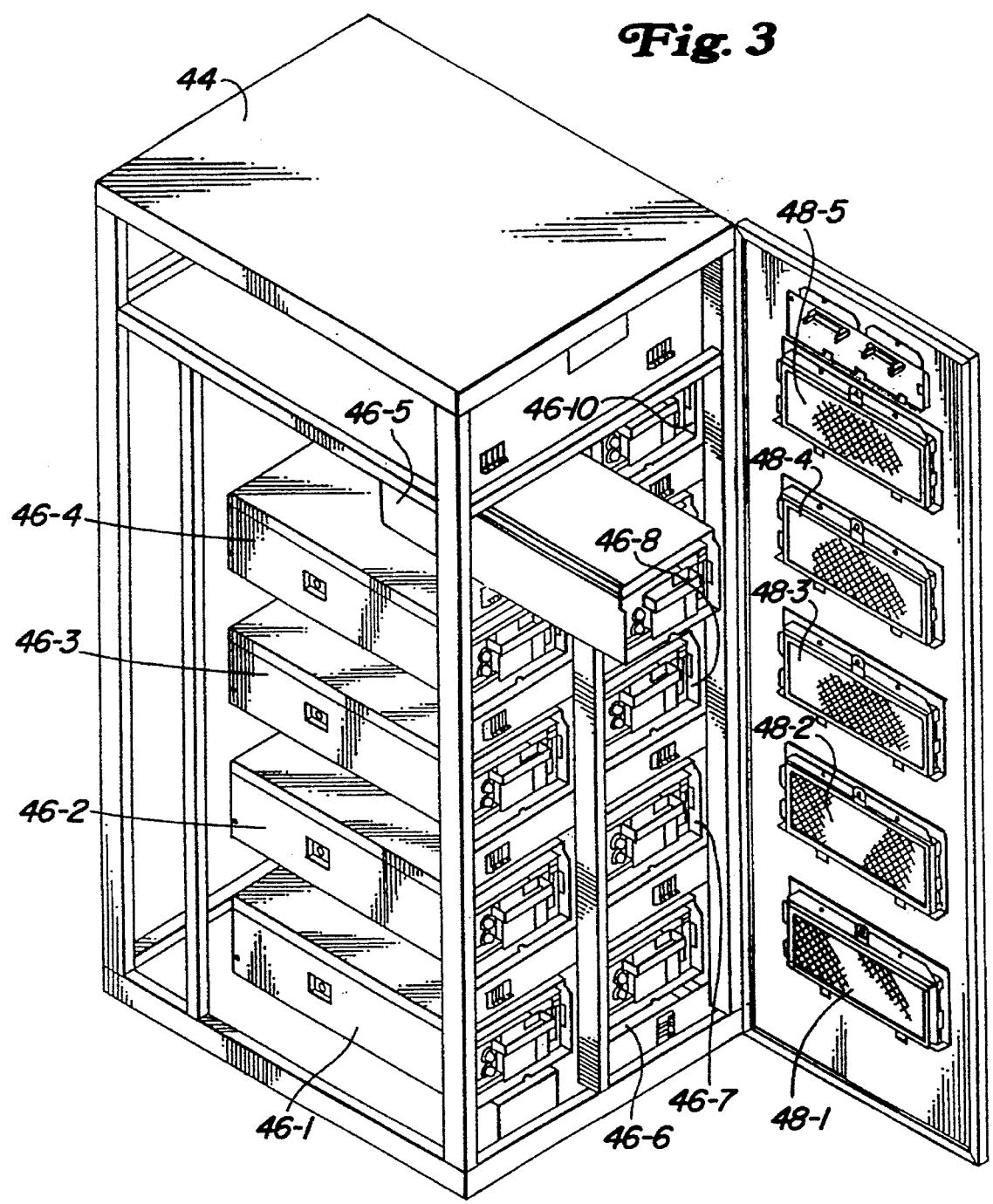
FIG. 3 is an explanatory diagram of a disk array casing of the invention.

FIG. 3 shows an embodiment of a casing structure of a disk array which is used in the invention. For instance, a disk array casing 44 forms enclosing sections of five stages and two columns and ten disk units 46-1 to 46-10 are installed in each enclosing section as shown in the diagram. A door 45 is provided for the disk array casing 44 so as to be freely opened or closed. Ventilating holes are formed in the door 45 at five positions in correspondence to the built-in disk units 46-1 to 46-10 with the construction of two columns and five stages. Filters 48-1 to 48-5 are attached to the insides of the ventilating holes as shown in the diagram. As a disk array casing 44 in FIG. 3, the maximum construction in which all of the ten disk units 46-1 to 46-10 have been installed is shown. However, the disk units of the necessary number can be also installed.

Figure 4:
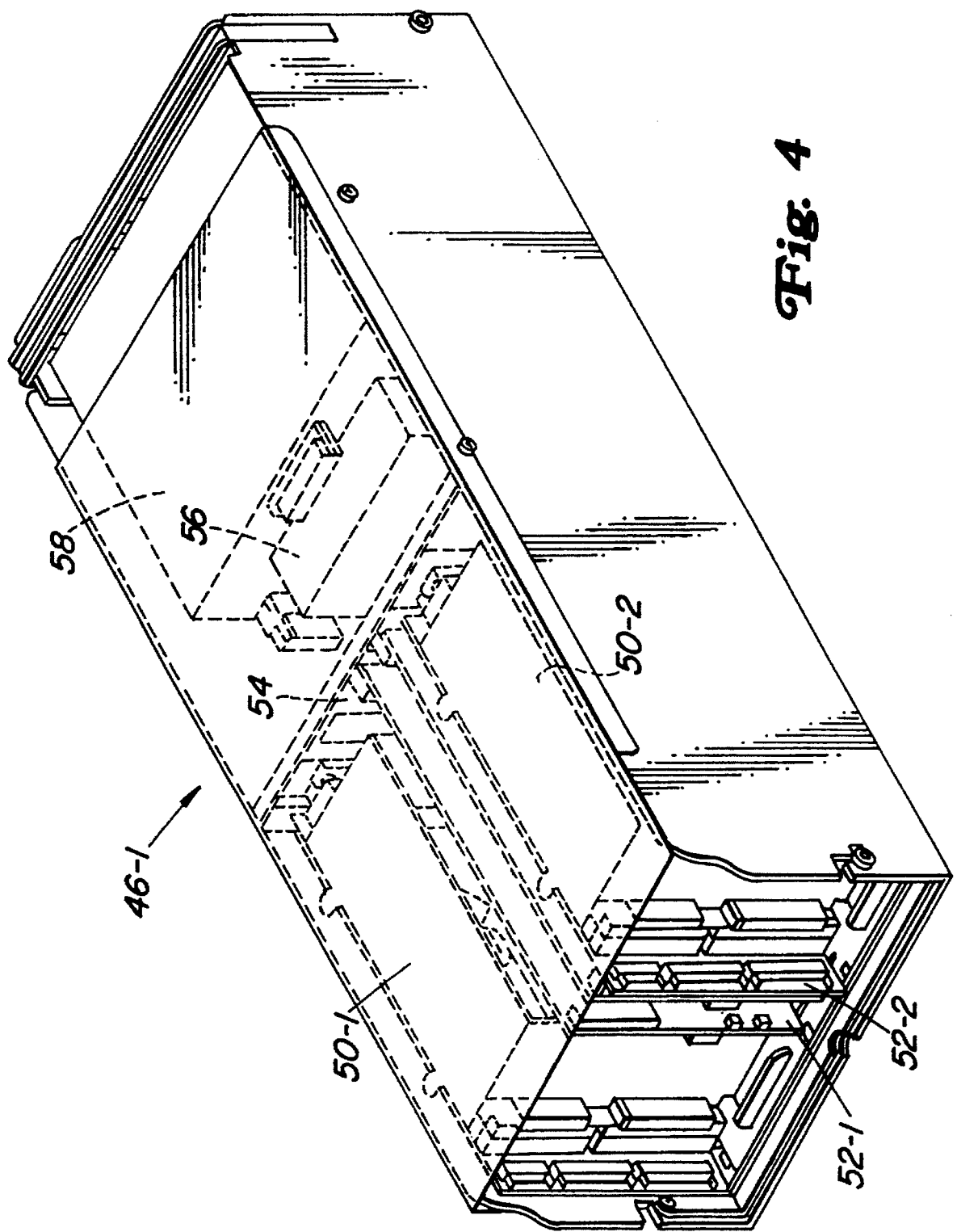
FIG. 4 is an explanatory diagram showing disk units which are installed into the casing of FIG. 3.

FIG. 4 shows the disk unit 46-1 installed in the disk array casing 44 in FIG. 3 as a representative disk unit. In the embodiment, two 3.5-inch disk modules 50-1 and 50-2 are installed in the disk unit 46-1. The rear portion of the casing is open. A module installation board 54 is attached at the center of the casing of the disk unit 46-1. The disk modules 50-1 and 50-2 assembled respectively to module circuit boards 52-1 and 52-2 are inserted from an opening portion on the rear side and are connected by connectors, so that they can be assembled in an operable state. A power source unit 56 and a cooling fan apparatus 58 are assembled on the right side of the module installation board 54. Although the 3.5-inch disk modules 50-1 and 50-2 are installed in the disk unit 46-1, the unit shape is set to substantially the same form and structure as those of a disk unit in which, for instance, one 5-inch disk module whose medium size is larger by one stage is built. Each of the 3.5-inch disk modules 50-1 and 50-2 has the same capacity as that of the 5-inch disk unit of the same unit size. Therefore, in an installing state of only either one of the 3.5-inch disk modules 50-1 and 50-2, by installing the disk unit to a disk array casing using the conventional 5-inch disk unit, a disk array using the 3.5-inch disk unit can be realized as it is. On the other hand, as shown in FIG. 4, by replacing the disk unit to the conventional 5-inch disk unit in a state in which two 3.5-inch disk modules 50-1 and 50-2 have been installed, the conventional 5-inch disk unit can be easily changed to the disk mirror apparatus in which two 3.5-inch disk modules are installed. Further, by properly deciding the number of 3.5-inch disk modules which are installed and the number of units, it is possible to realize a construction of a proper disk array including the case where the mirror disk units according to the performance of the input/output subsystem are used as component elements.

Figure 5B:
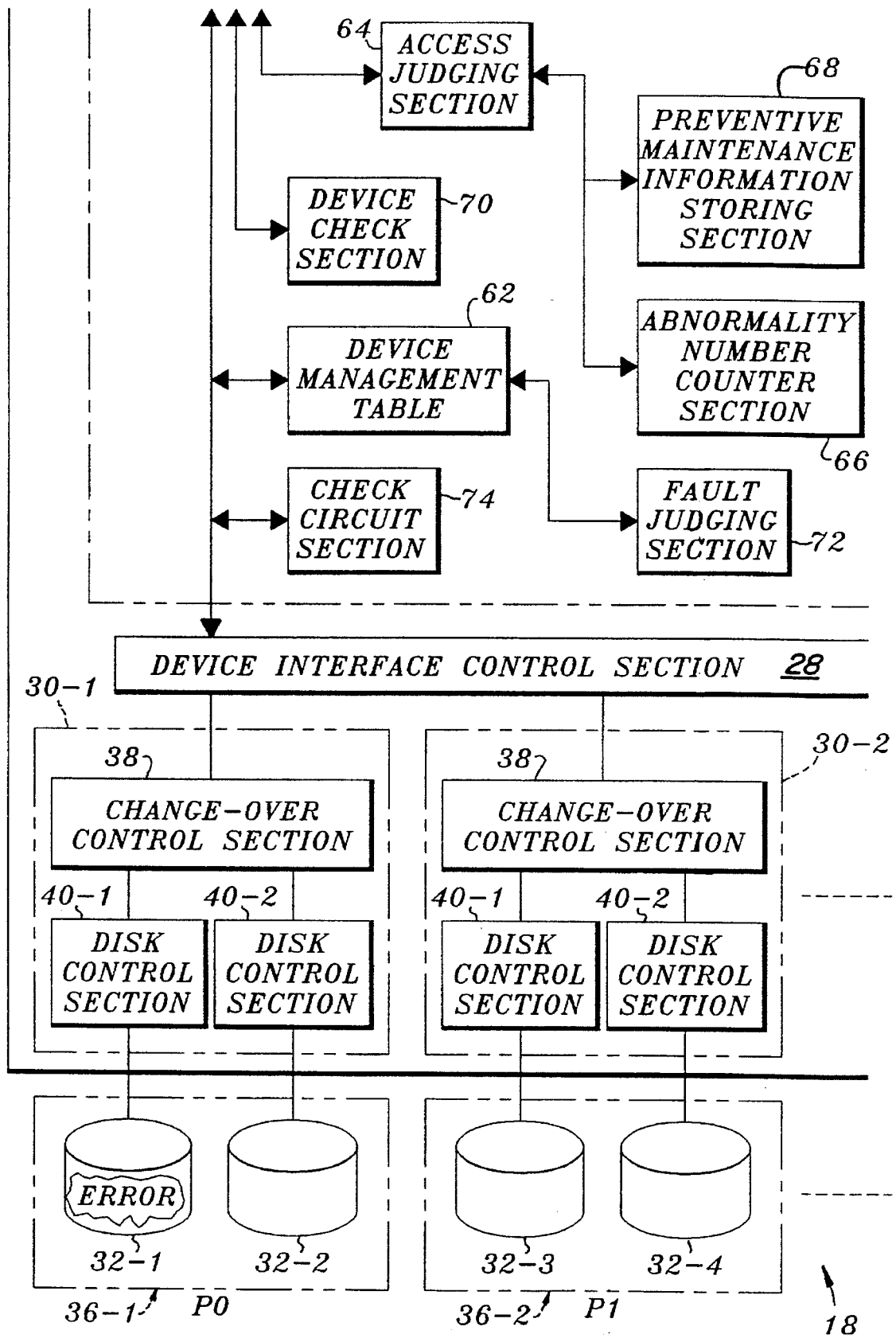
FIG. 5 is divided into three sections, 5A, 5B, and 5C, and is a block diagram showing the operation functions of the invention.

FIG. 5 shows processing functions of the invention. The functions as a disk array control section 60, a device management table 62, an access judging section 64, an abnormality number counter section 66, a preventive maintenance information storing section 68, a fault judging section 72, a data transfer control section 75, and a check circuit section 74 are realized by the program control of the MPU 20 provided in the controller 12 and the firmware. As a disk array 18 connected to the controller 12, only the mirror disks 36-1 to 36-4 of one rank are shown for simplicity of explanation. First, the disk array 18 executes various kinds of operations on the basis of the device management table 62. The device management table 62 has, for example, a construction shown in FIG. 6.

In FIG. 6, the device management table 62 can specify the disk unit by four parameters such as mirrored ID, device ID, rank number, and port number. When considering the rank R0 as an example, the mirrored ID indicates identification numbers (ID Nos.) which have been previously allocated to the mirror disk units 36-1 to 36-4 and indicates 00, 01, 02, and 03 in the embodiment. The device ID indicates device physical numbers in the disk array 18. For example, when considering eight disk units of the rank R0, they are shown by physical device ID "00" to "07". Further, the rank number indicates the rank positions R0 to R3 of the disk array 18. For instance, the rank position is shown by "00" with respect to the rank No. R0. The next port number indicates a port number of a mirror disk unit in the disk array 18. When considering R0 as an example, the mirror disks are shown by port numbers "00" to "03". Subsequent to the port number, the information of a present use flag, a spare flag, the number of abnormalities, and a fault flag indicative of the state of the disk unit provided in the disk array 18 has been registered. The present use flag and spare flag are initialized when the system is activated by turning on a power source. The present use flag 1 is set into the preceding device ID of the mirror disk unit which is designated by the mirrored ID. The spare flag 1 is set in the next device ID. The number of abnormalities is reset to 0 when activating. Similarly, the fault flag is also reset to 0 when activating. As the number of abnormalities, the count result of the abnormality number counter section 66 shown in FIG. 5 is stored. That is, when the reading or writing operation is executed for the disk array section 18 by the disk array control section 60, the access judging section 64 provided in the controller 12 discriminates whether or not an error such as seek error, read error, write error, or the like has occurred due to the check by the check circuit section 74. When the error is judged by the access judging section 64, the count value of the abnormality number counter section 66 is increased by "1". The count-up value is updated as the number of abnormalities on the device management table 62. Each time the abnormality number counter section 66 counts the abnormality, the fault judging section 72 compares the count value with a predetermined threshold value in the fault judgment. When the number of abnormalities reaches the threshold value in the fault judgment, it is decided that the fault has occurred. The fault flag of the device management table 62 is set to 1. FIG. 7 shows a state in which the number of abnormalities of the present use disk unit 32-1 of the mirror disk unit 36-1 having the mirrored ID=00 is equal to 10 and reaches the threshold value, so that the disk unit is judged as a fault disk and the fault flag is set to 1.

Further, the preventive maintenance information storing section 68 is provided for the controller 12 in FIG. 5. Each time the error is judged in the access judging section 64, the device ID indicative of the error occurrence device and the kind of error are stored as preventive maintenance information into the preventive maintenance information storing section 68. The preventive maintenance information stored in the storing section 68 can be always referred from the host computer 10 side before notification of the fault decision by the fault judging section 72. For example, by including the preventive maintenance information into status information when an arbitrary input/output is requested from the host computer 10 to the controller 12 and by returning such information, the existence of the preventive maintenance information is recognized on the host computer 10 side and the obtained preventive maintenance information is output to the display and printer and is displayed. Therefore, the operator or maintenance person can grasp a situation of the error generation of the disk unit on the controller 12 side in a real-time manner.

Further, a device checking section 70 is provided on the controller 12 side. The device checking section 70 is activated in an empty state in which there is no access from the host computer 10, namely, in an idle state of the controller 12 and executes a simulation of the writing operation using dummy data for the disk array 18. Therefore, a region which is used for the simulation to write dummy data by the device checking section 70 has previously been provided in each disk unit of the disk array 18. Such a region is a peculiar check region which is generally known as a CE region. With respect to the data writing simulation by the device checking section 70 as well, the access judging section 64 judges an error. When the error is detected, the count value of the abnormality number counter section 66 is increased by "1". When the count value of the counter section 66 reaches a predetermined threshold value, the fault judging section 72 judges the fault and sets the fault flag into the device management table 62 in a manner similar to the case of the requesting process of the host computer 10. Each time the access judging section 64 judges the error by the false accessing operation by the device checking section 70, the preventive maintenance information which can be referred is stored from the host computer 10 into the preventive maintenance information storing section 68. Further, under the control by the disk array control section 60, the data transfer control section 75 executes the data transfer between the disk array 18 and the host computer 10 in accordance with the access request from the host computer 10.

Figure 8:
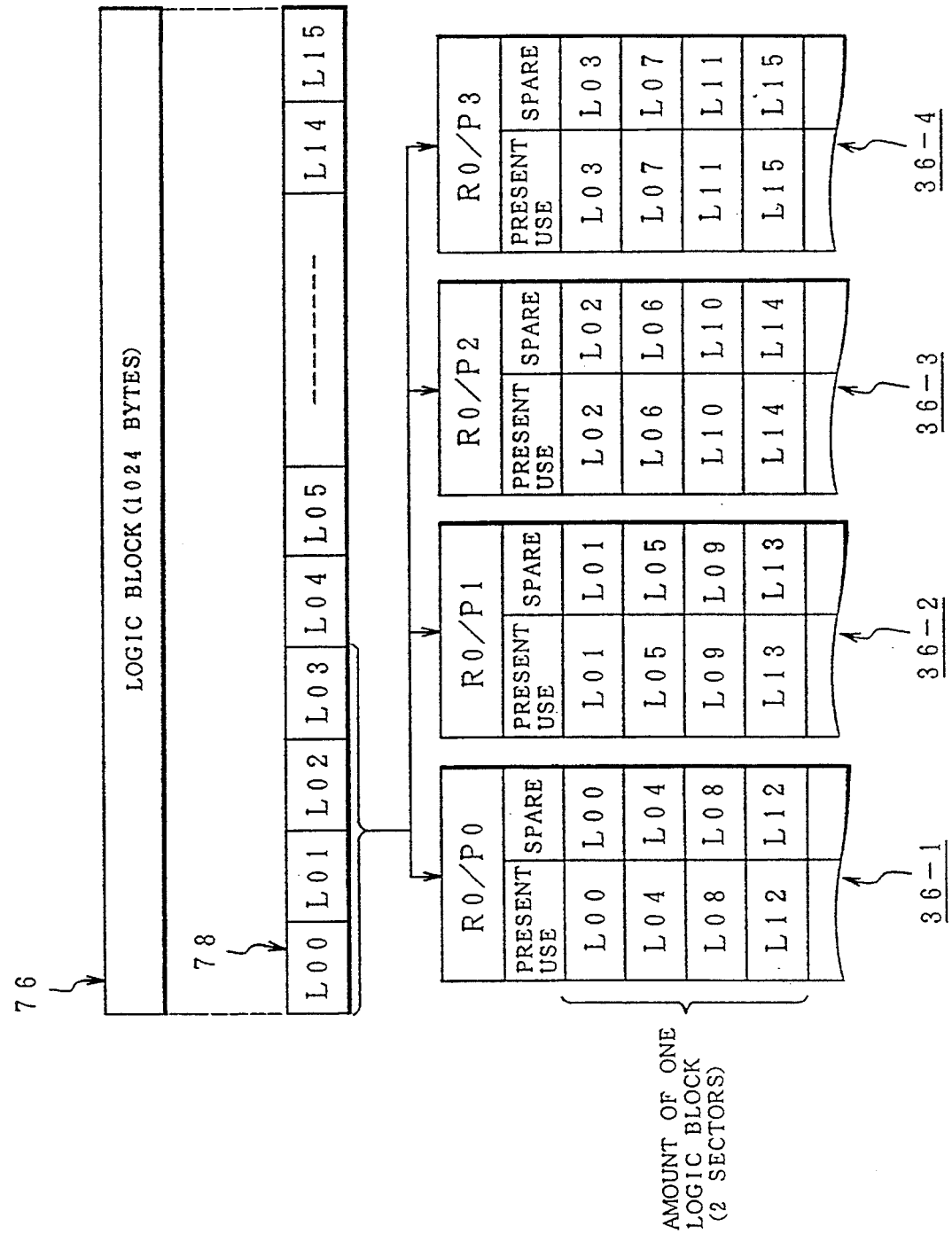
FIG. 8 is an explanatory diagram of a stripe data storing state in the invention.

The processing operation by the disk array control section 60 for the disk array 18 in which the mirror disk units are used as component elements will now be described. FIG. 8 shows the striping of the write data which is executed by the disk array control section 60 of the controller 12 and the data storing state on the disk array 18 side. The data unit which is accessed by the host computer 10 is shown by a logic block (host block) 76. For example, now assuming that one sector of the disk unit is constructed by 512 bytes, the logic block 76 has a size of two sectors, namely, 1024 bytes. When receiving the logic block 76 as write data from the host computer 10, the disk array control section 60 divides it into stripe data 78 of the number which is integer times as large as the number of parallel accesses of the disk array 18. In the example, there is shown the case where the logic block 76 is divided into 16 stripe data which number is four times as large as the number (four) of parallel devices. Therefore, when the logic block 76 of 1024 bytes is divided into 16 stripe data, a size of one stripe data is set to 64 bytes. That is, the 16 stripe data 78 obtained by dividing the logic block 76 are shown by stripe data L00 to L15. After the logic block 76 was striped, the stripe data 78 is extracted on a unit basis of the number of parallel devices and written in parallel into the mirror disk units 36-1 to 36-4. By repeating the parallel writing operations four times, the data of one logic block can be stored into the mirror disk units 36-1 to 36-4. When considering such processes with respect to one of the mirror disk units 36-1 to 36-4, the data each consisting of 64 bytes is distributed every four data and stored by the amount of two sectors. Such a data striping and storage of data are fundamentally the same as the operating mode of RAID3 and differ with respect to only a point that the parity data is calculated and is not stored. Each of the mirror disk units 36-1 to 36-4 is constructed by two disk units such as present use disk unit and spare disk unit and it will be obviously understood that the same data has been stored in each of the two disk units.

Figure 9A:
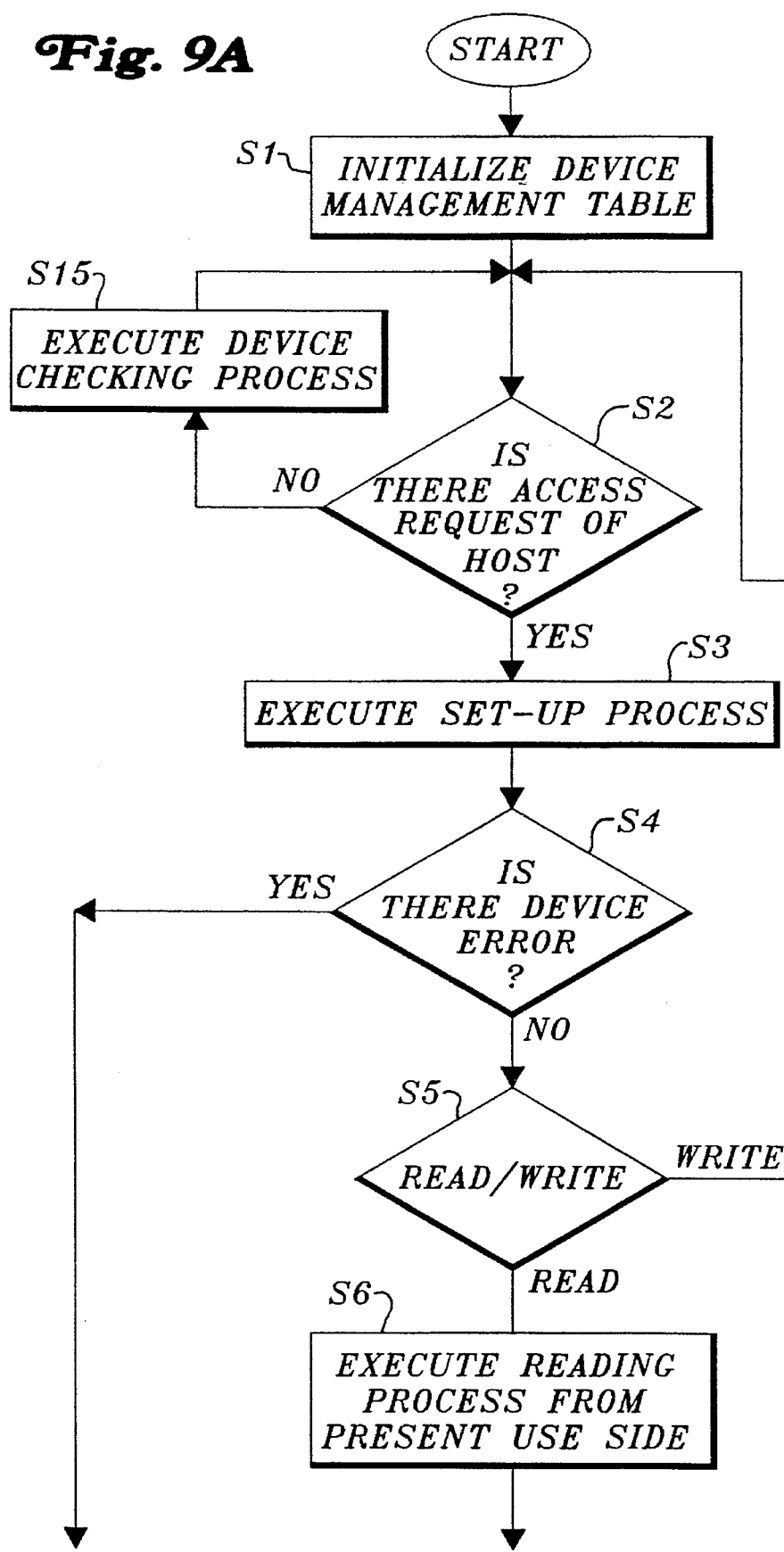
FIG. 9 is divided into two sections, 9A and 9B, and is a flowchart showing the processing operation of the invention.
Figure 9:
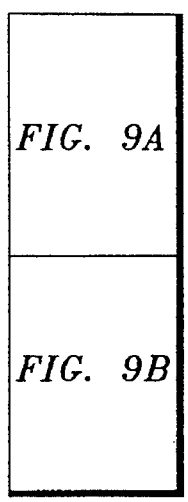
Figure 9B:
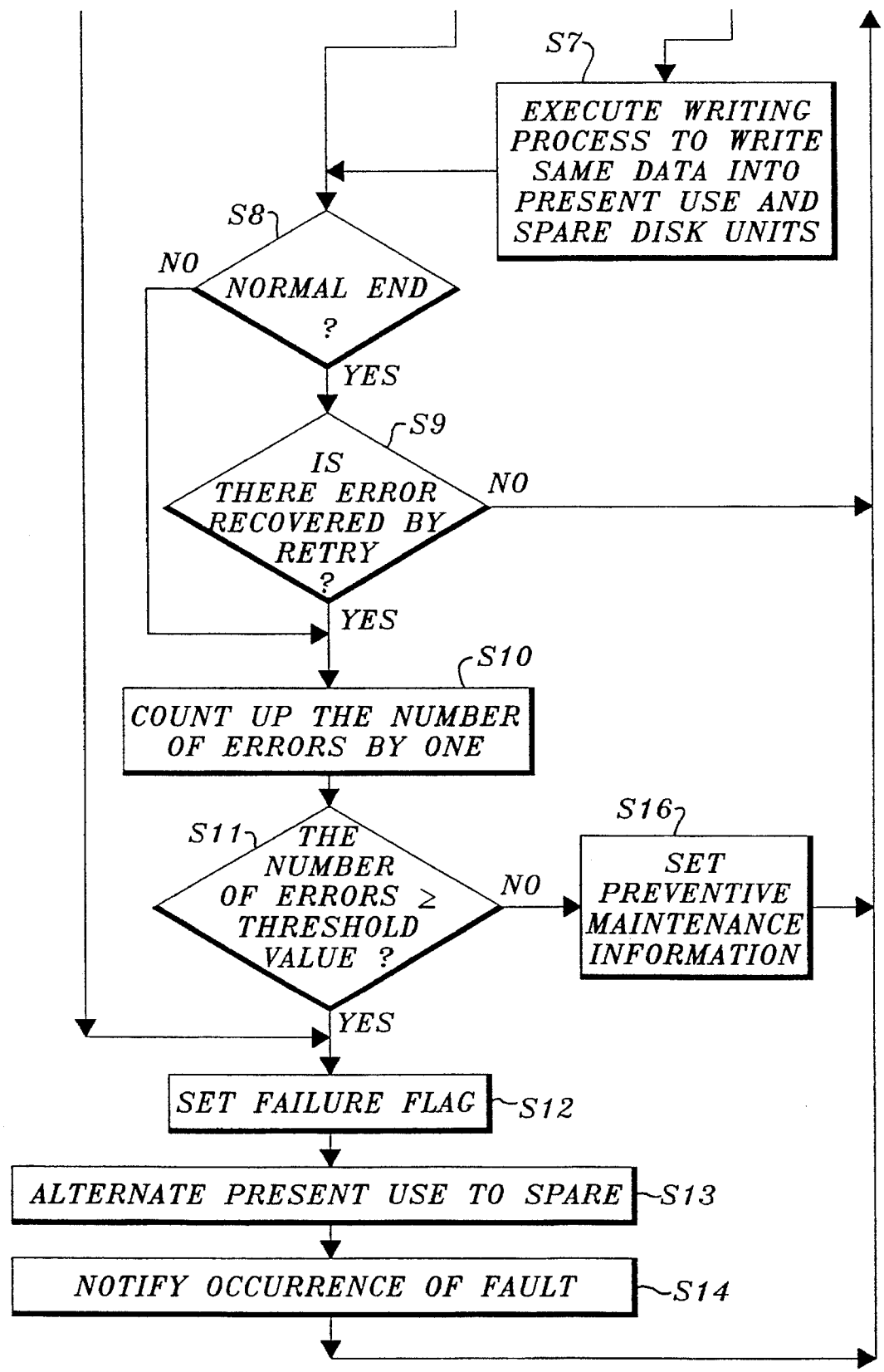

A flowchart of FIG. 9 shows the processing operation of the disk array apparatus of the invention by the controller 12 shown in FIG. 5. When the power source of the apparatus is turned on and the system is activated, the device management table 62 is initialized in step S1, for example, as shown in FIG. 6. In step S2, the presence or absence of the access request from the host computer 10 is discriminated. In an idle state in which there is no access request, a device checking process in step S15 is executed. When there is an access request, a set-up process is performed to the mirror disk unit of the designated device ID in step S3. For the set-up request from the controller 12, a normal response or an abnormal response is returned from each disk unit of the designated mirror disk unit. When both of the two disk units constructing the mirror disk unit are normal, it is judged in step S4 that there is no device error. The processing routine advances to step S5 and a check is made to see if the access request is a read request or a write request. In case of the read request, step S6 follows and the reading process to read out the data from the present use side disk unit of the mirror disk unit is executed. In case of the write request, step S7 follows and the writing process to write the same data into the present use disk unit and the spare disk unit is executed. In step S8, a check is made to see if the reading process in step S6 or the writing process in step S7 has normally been finished or not. If the reading or writing process was normally finished, a check is made in step S9 to see if there is either one of the seek error, write error, and read error which was recovered by the retry in the reading process or writing process. If NO, the processing routine is returned to step S2 and the system waits for the next access request from the host computer 10. In the case where either one of the seek error, read error, and write error which was recovered by the retry exists during the reading process or writing process in step S9, step S10 follows and the number of errors is increased by "1" in the abnormality number counter section 66. Subsequently, the fault judging section 72 compares the present number of error times with a predetermined threshold value. When it is smaller than the threshold value, step S16 follows and the preventive maintenance information regarding the error in this instance is set into the preventive maintenance information storing section 66. The processing routine is returned to step S2. When the number of errors is equal to or larger than the threshold value, step S12 follows. Since the operation will not be able to be performed in near future because of a failure such as a hardware error or the like, the device fault is judged and the fault flag is set into the device management table 62. For example, as shown in the disk unit 32-1 of the device ID No. 00 in FIG. 7, when the number of abnormalities is equal to 10 and reaches the threshold value, the fault flag is set to 1. When the fault flag is set, if the fault flag has been set to the present use disk unit in the next step S13, the present use flag which was allocated in the initializing process in step S1 is alternated to the spare flag.

For instance, as shown in FIG. 6, the present use flag is set to 1 and the disk unit 32-1 of the device ID No. 00 has been first set to the present use disk unit. However, since the fault flag 1 shown in FIG. 7 is set and the present use flag is reset to 0. The spare flag of the disk unit 32-1 of the device ID No. 01 to which the spare flag has been allocated so far as a disk unit for spare is reset to 0 and the present use flag is set to 1. In the embodiment, with respect to the present use disk unit 36-1 so far in which the fault flag 1 has been set, the present use flag is reset to 0 and the spare flag is also reset to 0. However, in the case where the operator wants to continue the writing operation in parallel, it is sufficient to reset the spare flag is to 0. As for such an exchange of the present use flag and the spare flag in the device management table 62, in the subsequent processes, the disk array control section 60 executes the writing process or reading process while setting the disk unit on the side in which the present use flag has been set to 1 is set to the present use disk unit and the disk unit on the side in which the spare flag has been set to 1 is set to the spare disk unit. Therefore, the present use disk unit so far in which the fault flag has been set is eliminated from the target of the reading process and the process is switched to the reading process of the disk unit which has been set to the present use disk from the spare disk. However, as shown in FIG. 7, when the spare flag is also reset to 0, the data writing operation is performed to only the disk unit which was switched from the spare disk to the present use disk.

Referring again to FIG. 9, when the alternation from the present use disk to the spare disk is finished in step S13, the occurrence of fault is notified to the host computer 10 in step S14, thereby promoting the operator or maintenance person to repair or exchange the disk unit in which the occurrence of the fault was decided. On the other hand, as for the set-up process in step S3, in the case where the disk unit designated by the device ID causes a hardware fault and cannot operate at all and a device error is judged, the processing routine immediately advances to step S12 and the preventive maintenance information is set in step S16, thereby enabling the hardware error to be referred from the host computer 10 side. In this case, if there is a fault of the present use disk unit, the alternation of the allocation to the spare disk is executed. Further, the preventive maintenance information is stored in step S16, thereby enabling the device error to be referred from the host computer 10 side. In case of the device error, different from the fault judgment based on the discrimination of the number of errors in step S11, such a fault cannot be recovered. Therefore, an ID display indicative of the malfunction of the disk unit is added to the preventive maintenance information, thereby making it possible to distinguish from the preventive maintenance information due to the software error.

Figure 10:
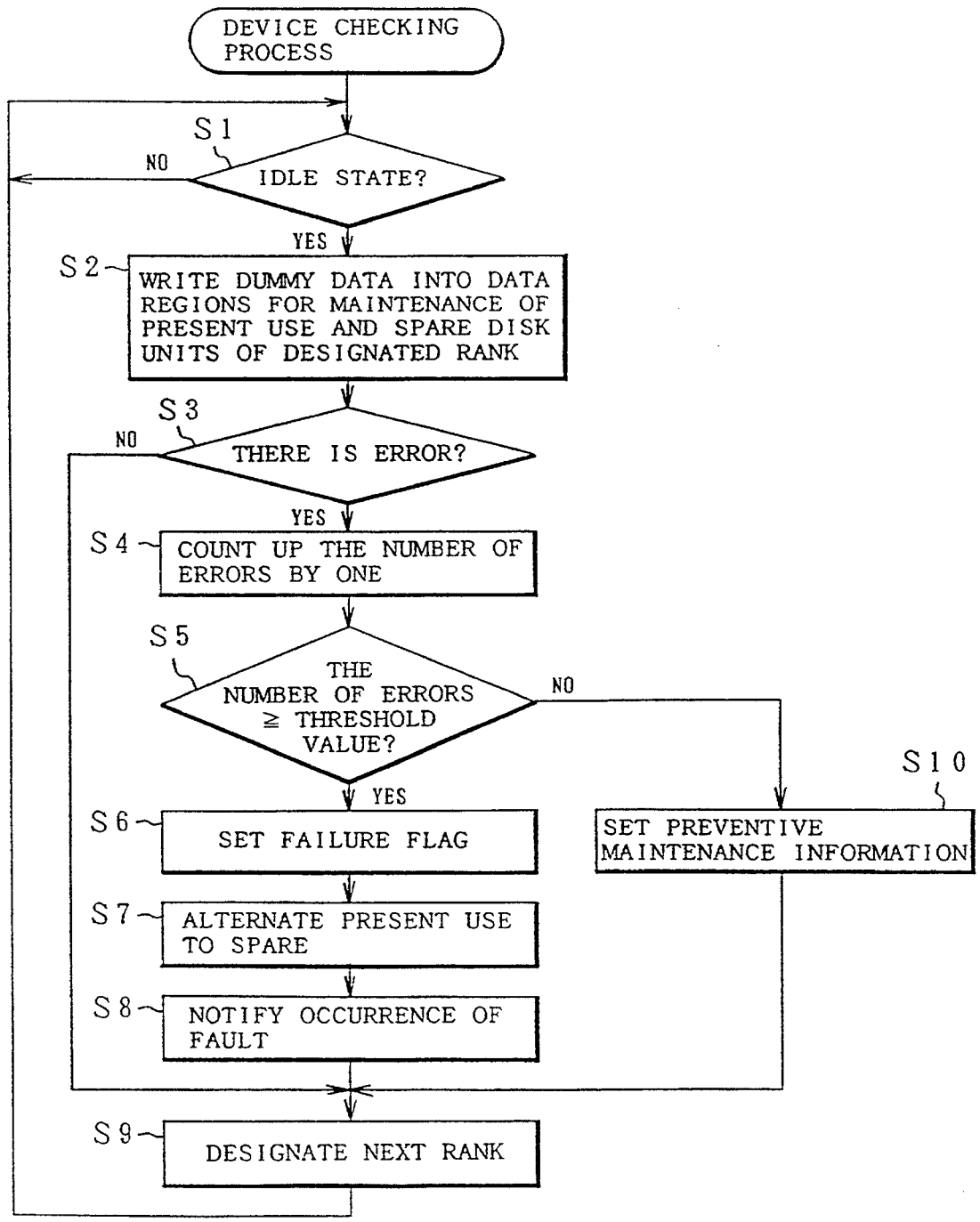
FIG. 10 is a flowchart showing a device checking process in the invention.

A flowchart of FIG. 10 shows a device checking process by the device checking section 70 of the controller 12 shown in step S15 in FIG. 9. First, in step S1, a check is made in step S1 to see if the controller 12 is in the idle state. If YES, the processes in step S2 and subsequent steps are executed. In step S2, the writing operation of dummy data is executed as a simulation to the data regions for maintenance which are provided in the present use disk unit and spare disk unit of the designated rank according to a predetermined order. When an error such as seek error, write error, or the like occurs in the writing operation of the dummy data, the occurrence of error is judged in step S3. The number of errors so far is increased by "1" by using the abnormality number counter section 66 in step S4. In step S5, the number of errors is compared with a predetermined threshold value. When it is smaller than the threshold value, the preventive maintenance information is set in step S10 and the processing routine is returned to step S1. When the number of errors is equal to or larger than the threshold value, the fault flag is set into the device management table 62 in step S6. Subsequently, in the device management table 62, the flag allocation to alternate the present use disk unit to the spare disk unit is exchanged with respect to the present use disk unit. In step S8, the occurrence of fault is notified to the host computer 10 in step S8. After completion of the above processes, the next rank is designated in step S9 and the processing routine is returned to step S1 and the idle state is again checked. By such a checking process, for instance, in an on-line system, in a time zone such as a night time when a processing load is small, the writing simulation to the disk units of the disk array constructing the mirror disk unit is automatically executed every predetermined checking period. Therefore, the states of the disk units are always monitored and the disk unit having a possibility of the occurrence of a fault can be predictively judged as early as possible.

Figure 11:
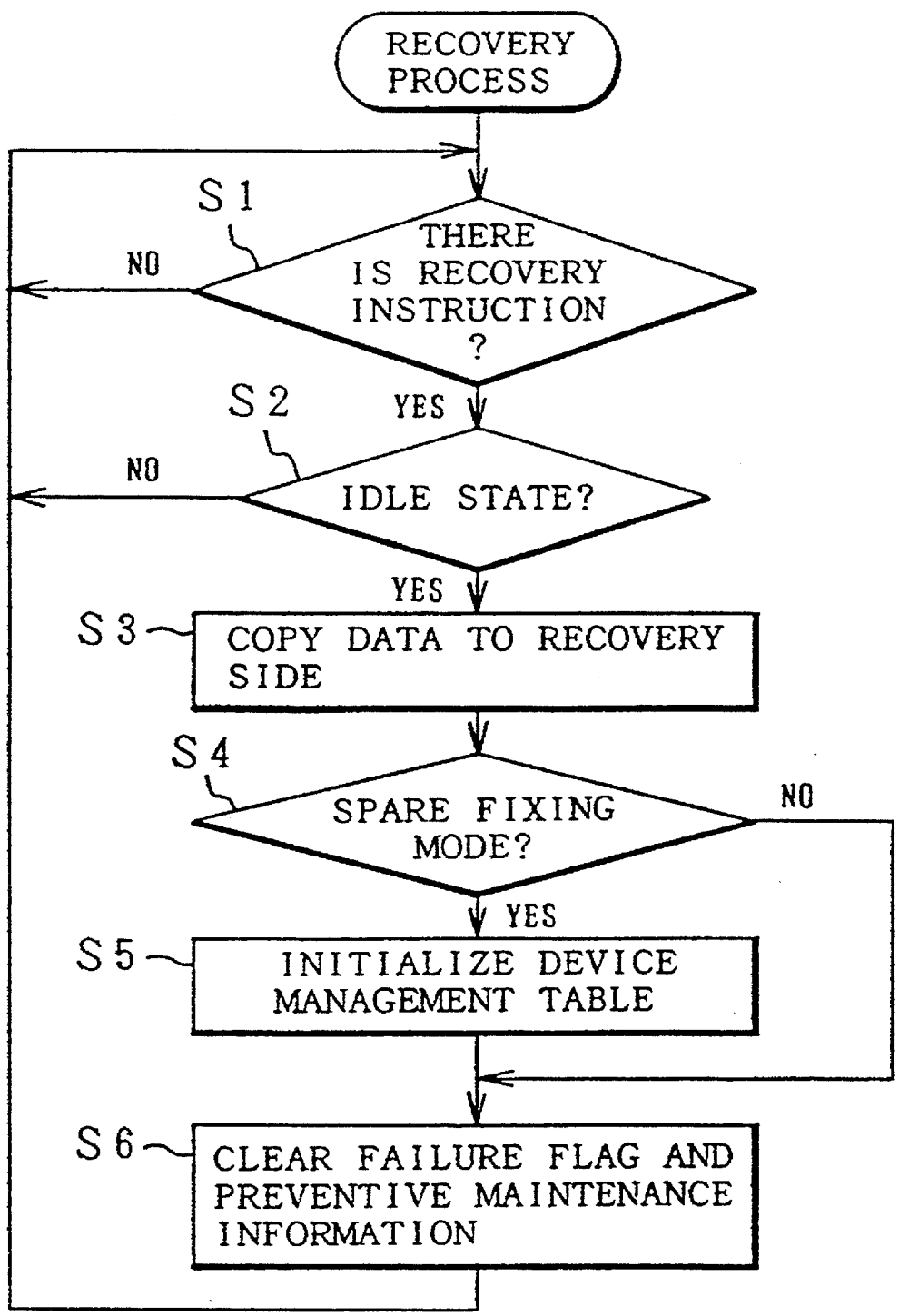
FIG. 11 is a flowchart showing a recovery process in the invention.

A flowchart of FIG. 11 shows a recovery process which is executed in the case where when the preventive maintenance information or fault information is output or displayed on the basis of the fault predictive judgment or device fault judgment on the controller side, the maintenance person removes the disk unit as a fault target from the disk array casing and repairs and installs the normal disk unit into the casing. First, in step S1, a check is made to see if there is a recovery instruction by a command from the host computer or a switch operation by the maintenance person after completion of the assembly of the normal disk unit into the casing or not. When there is the recovery instruction, step S2 follows and a check is made to see if the controller 12 is in the idle state or not. If YES, step S3 follows and a process to copy the data of the present use disk unit to the disk unit on the recovery side which was newly assembled to the fault side of the mirror disk unit is started. In step S4, a check is made to see if the spare fixing mode has been set or not. That is, in the case where the present use disk unit and the spare disk unit have fixedly been allocated for the two disk units constructing the mirror disk unit, at a time point of the completion of the data copy, the present use flag and spare flag of the device management table 62 are initialized to the same state as that upon activation of the system. On the contrary, when the dynamic mode is set without fixing the present use disk unit and spare disk unit, the initialization of the device management table 62 is not executed in step S5. The disk unit which functions at present is maintained as a present use disk unit and the disk unit assembled due to the recovery is set to the spare disk unit. Further, in step S6, the preventive maintenance information is cleared and the fault flag in the device management table and the number of abnormalities are cleared.

FIG. 12 shows the second embodiment of the invention. The embodiment is characterized in that the disk array of the mirror disk construction is used and the parity is stored as redundant information simultaneously with the parallel access of data. That is, although the reliability is fairly improved by the mirrored construction of the disk array, by further storing the redundant information in addition to the mirrored construction, an extremely high reliability can be realized. In FIG. 12, although a construction of the mirror disk for data is substantially the same as that in the embodiment of FIG. 1, four mirror disk units 36-31 to 36-35 are provided for the port P4 from the mirrored control section 30-5 in order to store a parity.

Figure 13:
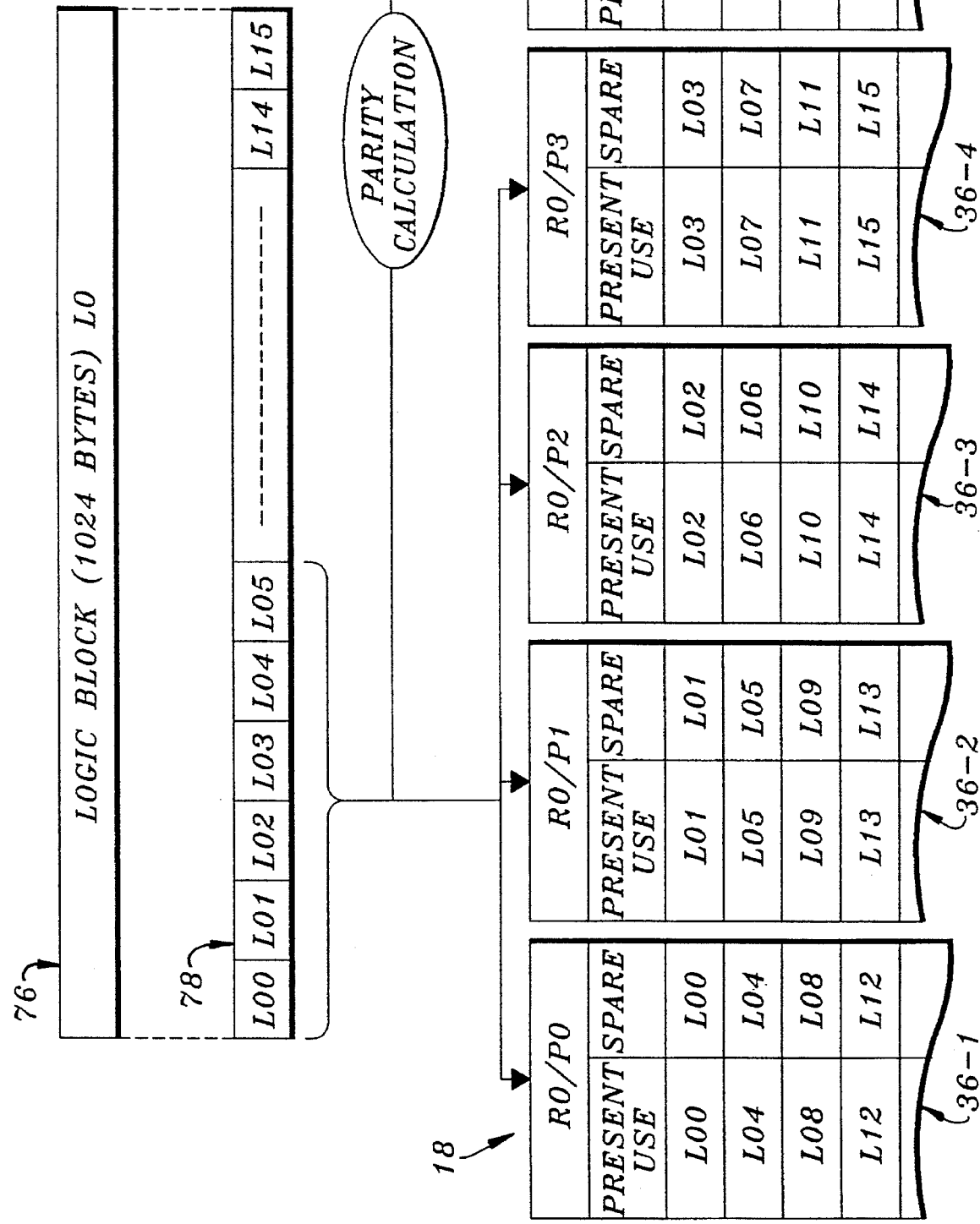
FIG. 13 is an explanatory diagram of an operation form of RAID3 in FIG. 12.

FIG. 13 shows the processing operation in the operating mode of RAID3 in the disk array of the mirror disk construction to perform the parity storage in FIG. 12. The striping of the logic block 76 in RAID3 is executed in substantially the same manner as that in the case where no parity is stored as shown in FIG. 8. For the mirror disk unit 36-5 for parity which is newly provided, a parity P00 is calculated from four stripe data 78 such as L00 to L03 of a unit of the number (4) of parallel devices and simultaneously stored into the present use disk unit and spare disk unit of the mirror disk unit 36-5. In case of the operation form of RAID3 to store the parity as mentioned above, even in the case where two disk units of the present use disk unit and the spare disk unit constructing either one of the mirror disk units 36-1 to 36-5 simultaneously fail and the data is lost, the lost data can be reconstructed from the data of the remaining normal mirror disk unit.

Figure 14:
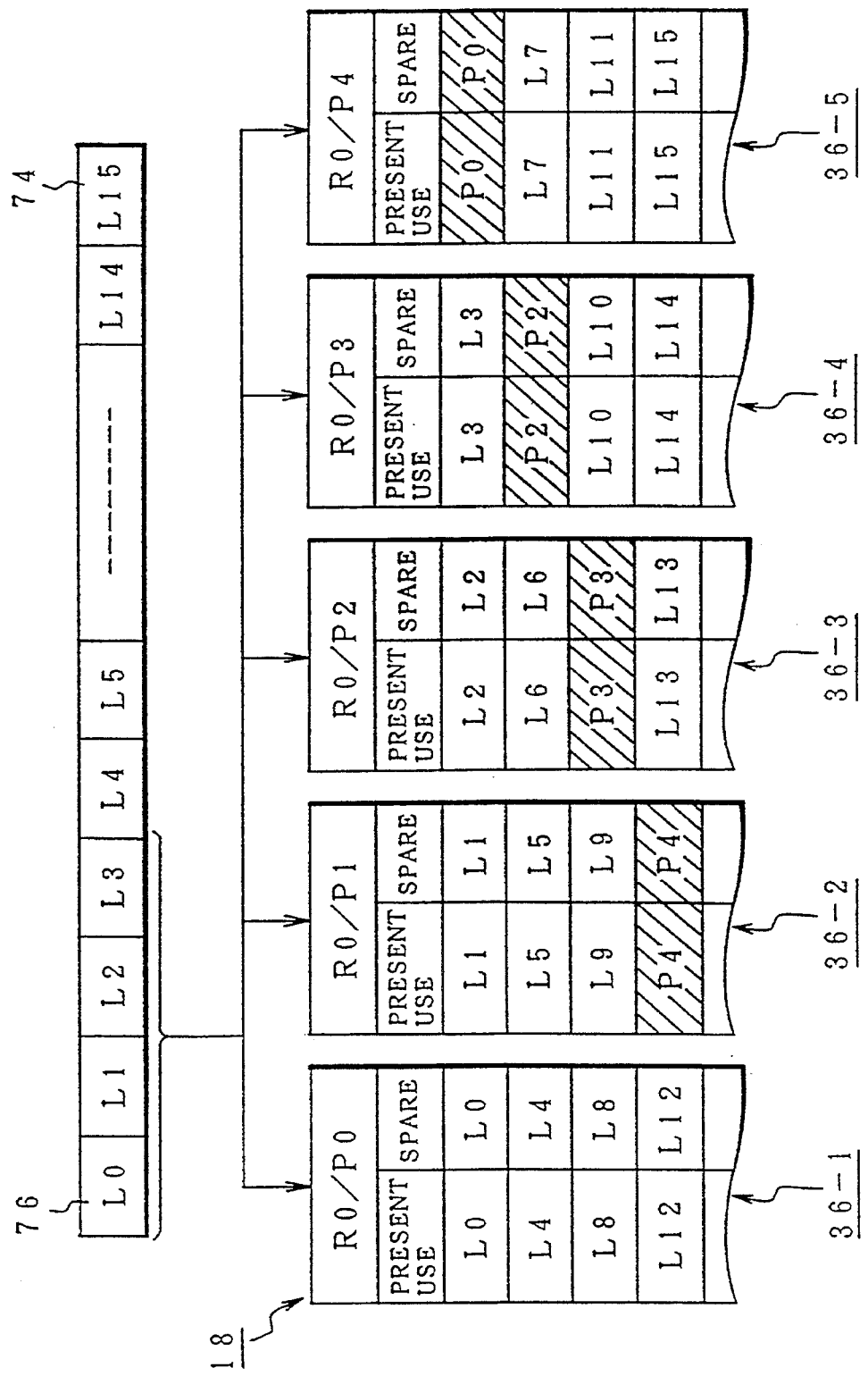
FIG. 14 is an explanatory diagram of an operation form of RAID5 in FIG. 12.

FIG. 14 shows the striping of the data and the data storing state according to the operation form of RAID5 with respect to the embodiment of FIG. 12. First, the logic block 76 has a size of, for instance, one sector (512 bytes) of the disk unit. FIG. 14 shows a state in which six logic blocks L0 to L5 are provided as write data. With respect to such write data, four logic blocks corresponding to the number (4) of logic devices, for example, the logic blocks L0 to L3 are striped and are respectively stored into the mirror disk units 36-1 to 36-4 in parallel. At the same time, the parity P0 is calculated from the logic blocks L0 to L3. With respect to such a sector, the parity P0 is stored into the mirror disk unit 36-5. In RAID5, the storing position of the parity sequentially changes every sector as shown in P0, P1, P2, P3, and P4. Even in the operation format of the disk array in which the mirror disks of RAID5 are used as component elements, even when two disk units of the present use disk unit and the spare disk unit constructing one mirror disk simultaneously fail, the data can be reconstructed from the other normal mirror disk unit.

Figure 15A:
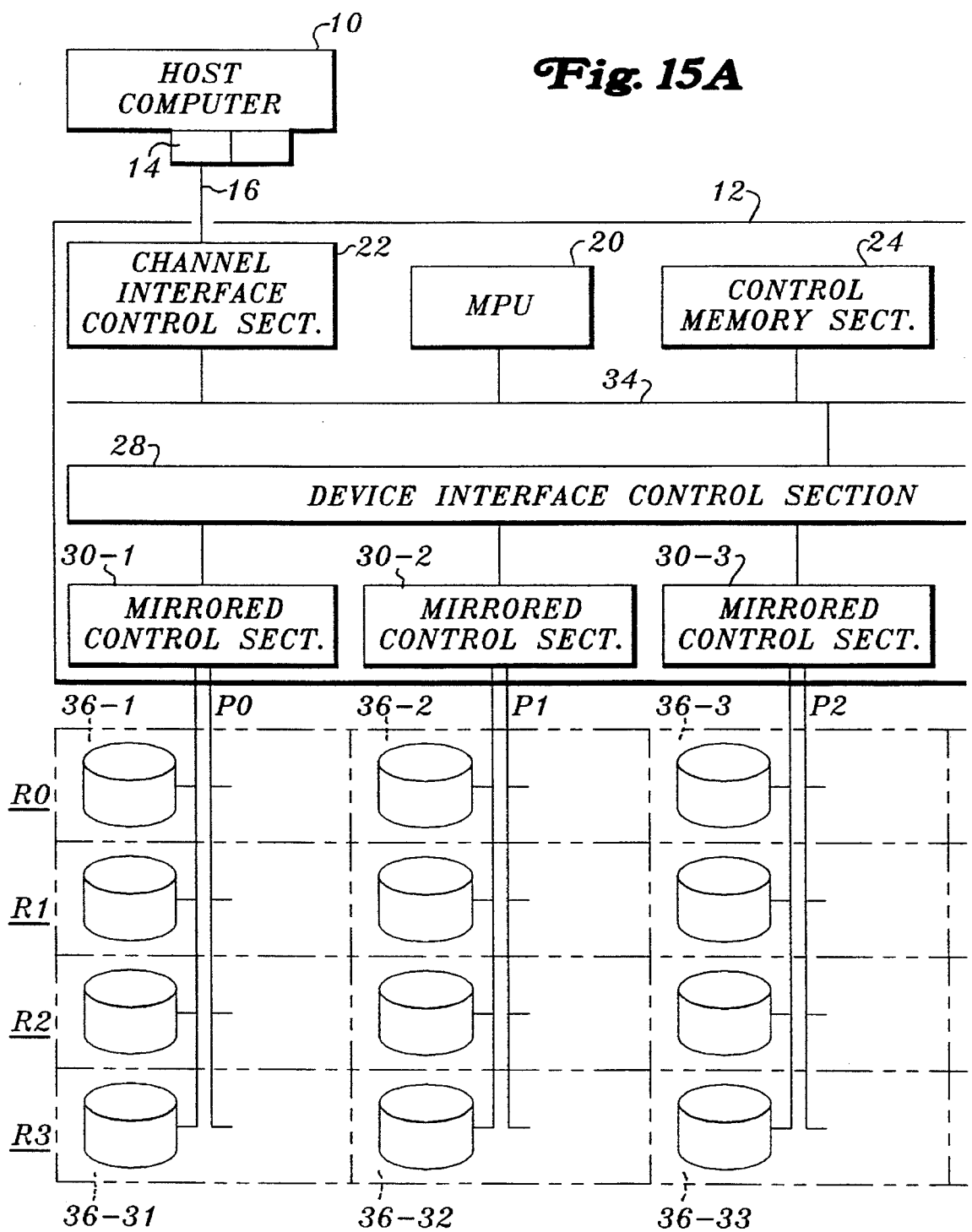
FIG. 15 is divided into two sections, 15A and 15B, and is a block diagram showing a change in construction of a disk array apparatus which is not mirrored.

FIG. 15 shows the case of a disk array apparatus of an ordinary RAID construction in which with respect to the embodiment of the disk array by the mirror disk units to perform the parity storage shown in FIG. 12, the disk unit on the spare side of each mirror disk unit is eliminated. In the invention, the disk unit 46-1 in which the 3.5-inch disk modules 50-1 and 50-2 shown in FIG. 4 have been installed is assembled into the disk array casing, thereby constructing the disk array in which the mirror disk units are used as component elements. Therefore, by eliminating one of the disk modules installed in the disk unit, an installing state of the ordinary RAID construction can be easily realized. On the contrary, by adding the disk module with respect to the ordinary RAID construction of FIG. 15, the disk array of the mirror disk construction shown in FIG. 1 or 12 can be easily realized.

Figure 16A:
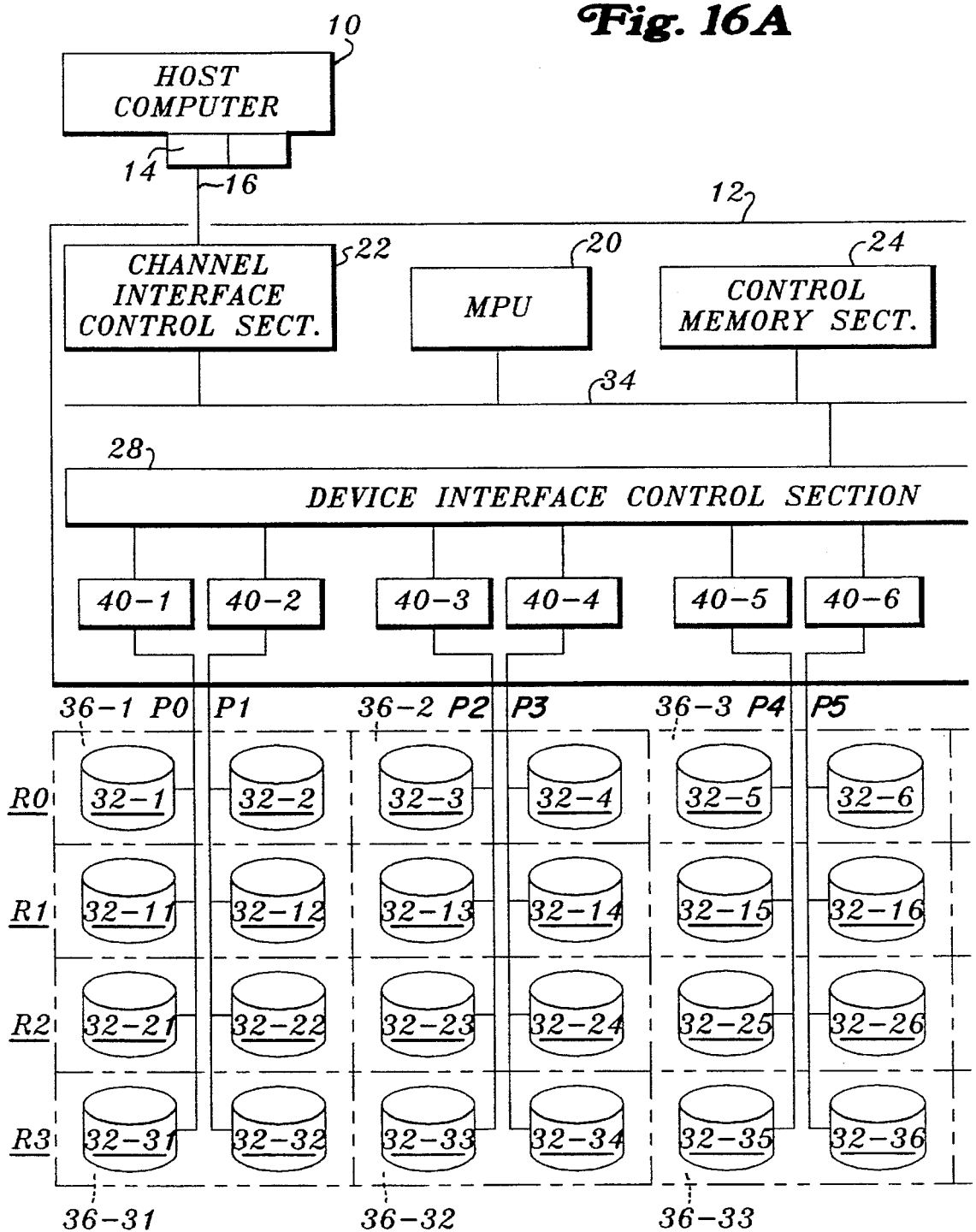
FIG. 16 is divided into two sections, 16A and 16B, and is a block diagram showing another embodiment of the invention which was mirrored by a port construction.

FIG. 16 shows the third embodiment of the disk array apparatus of the invention in which the mirror disk units are used as component elements. The third embodiment is characterized in that the disk units connected to the independent port from the controller 12 are combined and are allowed to operate as a mirror disk unit. That is, in the embodiment of FIG. 1, the controller 12 provides the mirrored control sections 30-1 to 30-5 for the device interface control section 28 and, with respect to the mirrored control sections, as shown in FIG. 2, by switching them by the change-over control section 38, the function as a mirror disk unit is realized. On the other hand, in the embodiment of FIG. 16, disk control sections 40-1 to 40-8 are individually provided for the device interface control section 28, ports P0 to P7 of the disk array 18 are independently constructed, and the disk units 32-1 to 32-38 of four ranks are connected to the ports P0 to P7, respectively. The mirrored ID numbers and the device ID numbers in the device management table 62 as shown in FIG. 6 are allocated to such independent ports P0 to P7 of the disk array 18, so that the mirror disk units 36-1 to 36-34 can be allocated to the disk array 18.

Figure 17:
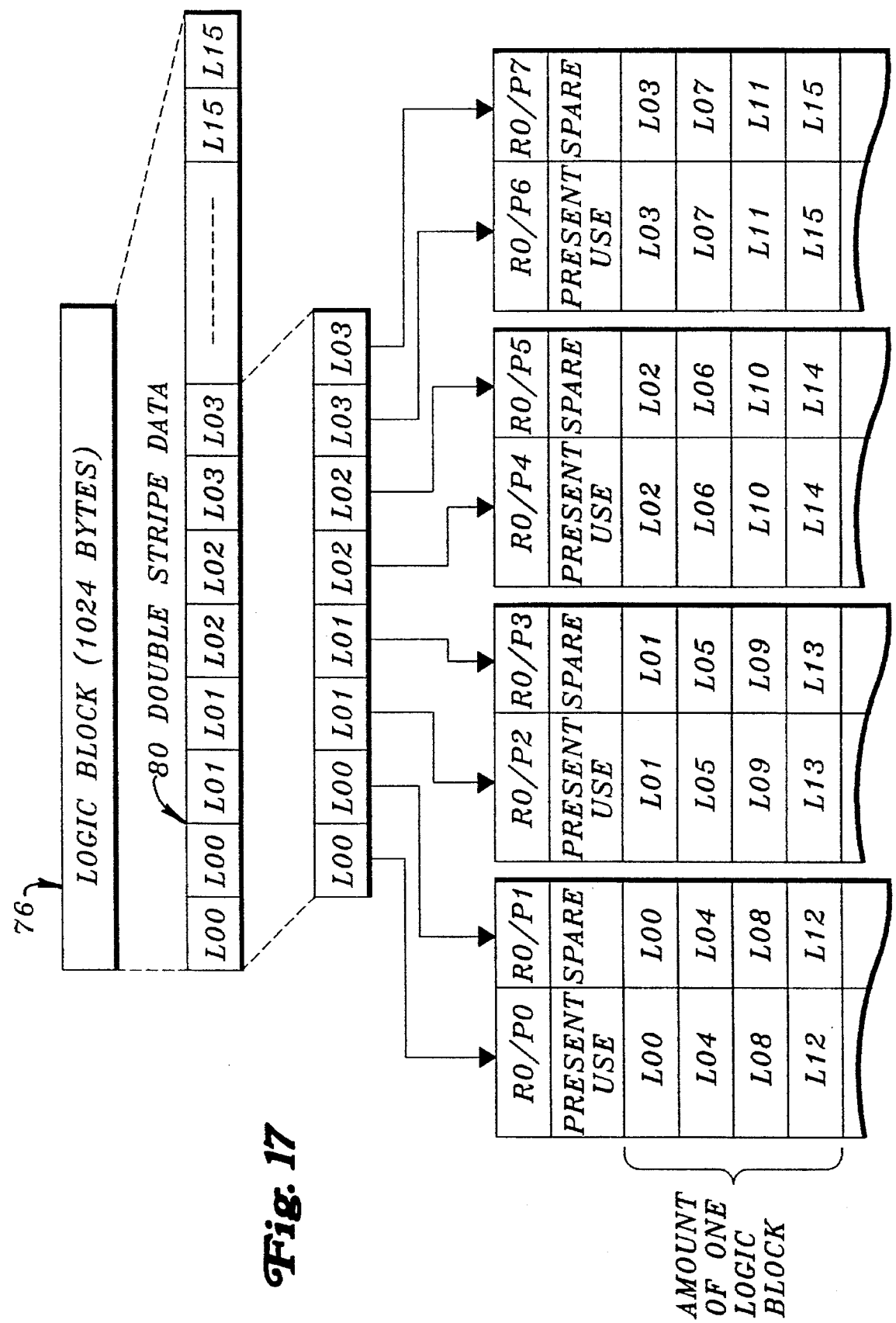
FIG. 17 is an explanatory diagram of a data striping in FIG. 16.

FIG. 17 shows a data striping for the mirror disk units of the disk array 18 having the independent ports in FIG. 16 and a data storing state. The controller 12 is not particularly conscious whether the disk array 18 has the mirror disk construction or not. The data obtained by striping the logic block 76 is merely transferred to the disk unit that is designated by the device ID. As for the data striping from the logic block 76, in this case, the logic block 76 is divided into, for example, 16 data to thereby obtain the stripe data L00 to L15. At the same time, the same data L00 to L15 are formed, thereby producing double stripe data 80 in which every two data L00 to L15 are arranged as shown in the diagram. For the formation of the double stripe data 80, the controller 12 is not aware of the mirror disk units but extracts the double stripe data of the number as many as the number (eight) of parallel devices, for example, L00, L00, . . . , L03, L03 and writes in parallel. Thus, the same data storing state as that of the mirror disk units can be realized. As mentioned above, even if the controller 12 side doesn't have the change-over control mechanism that is peculiar to the mirror disk units, by merely increasing the number of ports of the controller of the ordinary RAID construction, the disk array apparatus in which the mirror disk units are used as component elements can be easily realized.

Figure 18A:
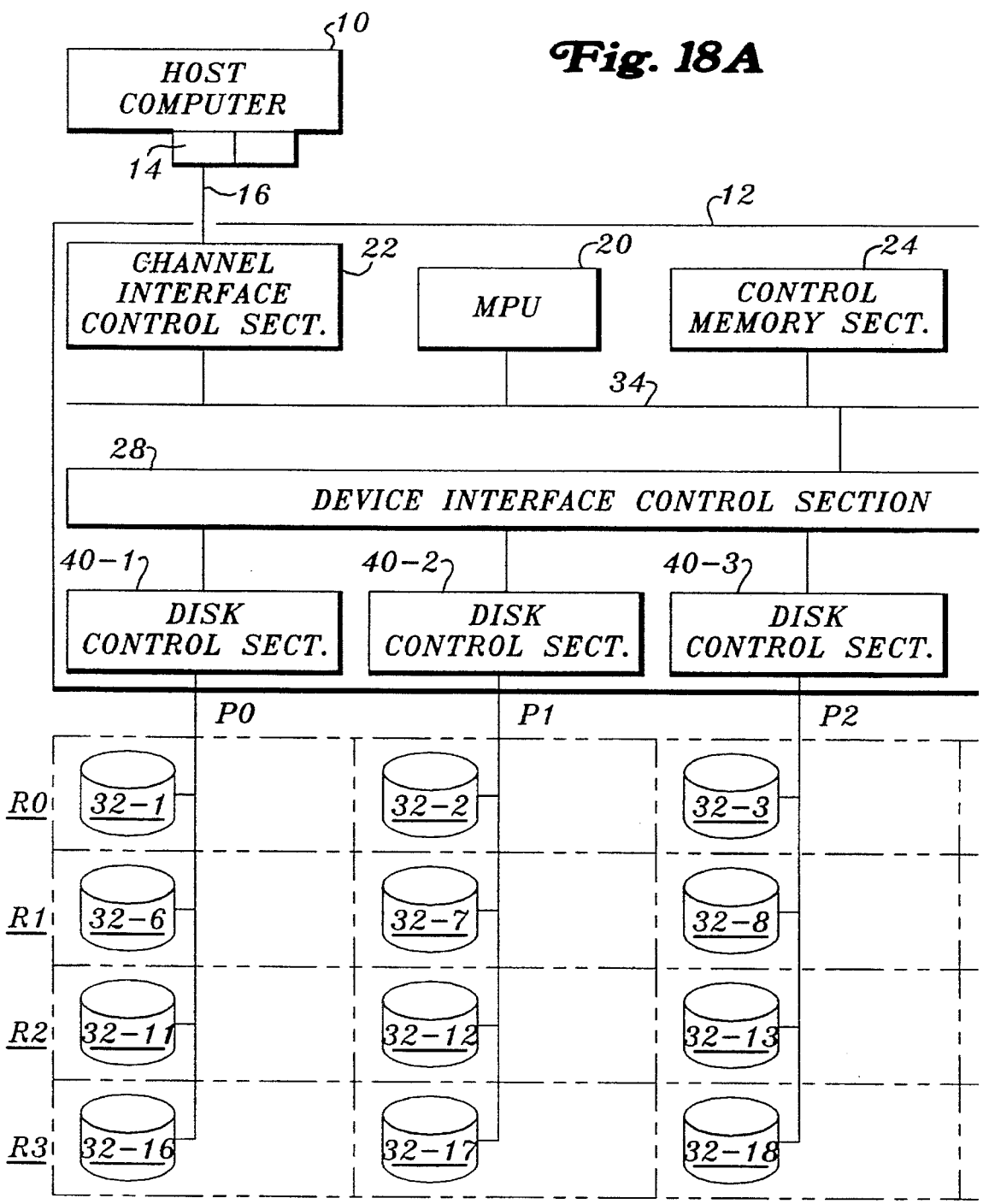
FIG. 18 is divided into two sections, 18A and 18B, and is a block diagram showing another embodiment of the invention in which a dynamic mirror disk is constructed and controlled.

FIG. 18 shows the fourth embodiment of the disk array apparatus of the invention. The fourth embodiment is characterized in that when a fault of a disk unit is predictively judged, the mirror disk units are dynamically constructed. The maximum drawback of the disk array apparatus in which the component elements of the disk array are set to the mirror disk units is that the number of disk units which are used in the disk array increases to the value that is twice as large as that of the ordinary apparatus and the costs rise. However, in association with the miniaturization and low costs of the disk unit, the above problem is not always an obstacle. However, it is still demanded to reduce the number of disk units which are used in the disk array. The embodiment of FIG. 18 relates to an example of the rank construction of four stages in which the ports P0 to P4 are provided for the disk array 18 in correspondence to the disk control sections 40-1 to 40-5 provided for the controller 12. The ports P0 to P3 of the disk array 18 are used for data storage and a single disk unit is connected every rank. On the other hand, the spare disk units 32-5, 32-10, 32-15, and 32-20 are connected to the port P4. Generally, the data reading and writing operations are executed in parallel for the ports P0 to P3 every rank of the disk array 18. When the number of errors of either one of the disk units reaches the threshold value and the occurrence of a fault is decided in the above state, the construction control of the mirror disk units by the use of the spare disk unit existing at the same rank is executed. It is necessary to copy the data from the present use disk unit to the spare disk unit in the construction control of the mirror disk unit by the use of the spare disk unit. However, when the ordinary fault judgment is executed with respect to the present use disk unit, the data cannot be copied. Therefore, the threshold value of the number of errors which is used in the fault judgment is set to a slightly low value and the fault is predictively judged at an early stage, thereby executing the construction control to the mirror disk unit. As a threshold value to start the construction control mentioned above, for instance, it is sufficient to use a value which is about half of the threshold value that is used in the ordinary fault judgment of the number of errors. For example, assuming that the fault is judged on the basis of ten times, the fault is early discriminated by the threshold value of five times in this case. The disk unit which was predictively judged as a fault disk unit by such a construction control subsequently operates as a mirror disk unit in combination with the spare disk unit. In the case where the occurrence of the fault is judged by the ordinary threshold value after that, the accessing mode can be soon instantaneously switched to the normal data access by the spare disk unit as one of the mirror disk units.

Figure 19:
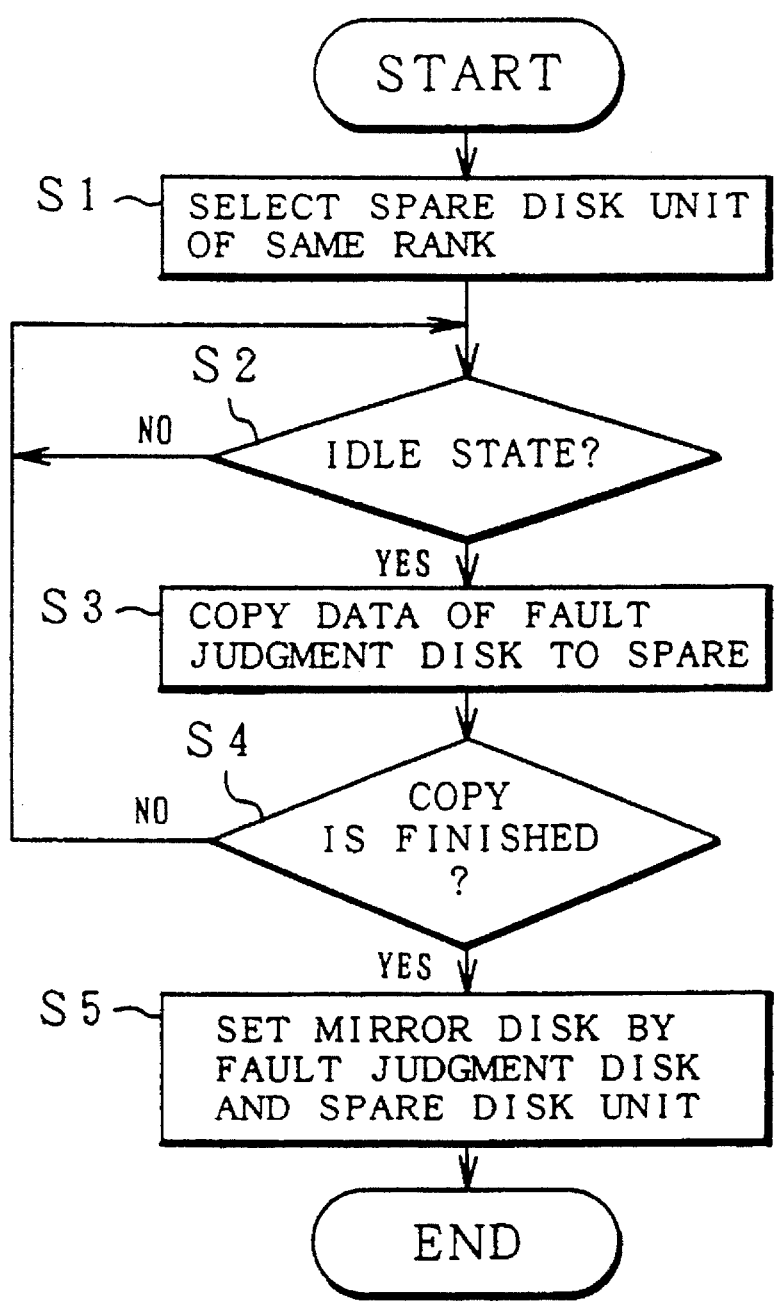
FIG. 19 is a flowchart showing a dynamic mirror disk construction and control in FIG. 18.

A flowchart of FIG. 19 shows a construction control to the mirror disks at the time of the predictive fault judgment in FIG. 18. When the fault predictive judgment is executed in a proper disk unit by the fault judging section 64 or device checking section 70 shown in FIG. 5, the process in FIG. 19 is started. First, in step S1, the spare disk unit at the same rank as that of the disk unit which was judged as a fault target is selected. In step S2, a check is made to see if the controller 12 is in the idle state. If YES, step S3 follows and a process to copy the data of the disk unit which was determined to be the fault disk to the selected spare disk unit is started. In the case where there is a read request or write request from the host computer 10 during the copying operation, the copying process is once stopped and the reading or writing operation is preferentially executed. After that, the copying process is restarted when there is no access request for a time over a predetermined time. Such a process is similar to a write back process in a disk cache in which data is written to the disk unit by using an empty time after completion of the cache writing operation. When the data copy to the spare disk unit is finished in step S4, step S5 follows and the setting to the device management table 62 such that a set of the disk unit which was judged as a fault disk and the spare disk unit into which the data was copied are set into one mirror disk unit is executed. The processing routine is returned to the ordinary process. Therefore, after the dynamic mirror disk construction control was executed, the processing operation in which the mirror disk unit comprising the disk unit in which a predictive fault was judged and the spare disk unit is included as one of the component elements of the disk array is executed. Therefore, even if a fault actually occurs due to a hardware error subsequent to the fault prediction, by performing the change-over by the mirrored spare disk unit, the system can immediately cope with a request from the upper apparatus. Since the judgment result of the predictive fault can be seen from the host computer 10 side as preventive maintenance information, the disk unit as a judgment target of the predictive fault can be soon repaired or exchanged. Even in the repair or exchange as well, since the construction control of the mirror disk units by the spare disk unit has already been completed, the disk unit as a target of the predictive fault can be removed and repaired or exchanged without newly needing the alternating process of the disk unit. In the embodiment of FIG. 18, the disk array apparatus of substantially the same extremely high reliability as that in case of using the component elements of the disk array as mirror disk units can be realized by the same number of disks as that in case of the spare disk units provided for the disk array which operates in the ordinary operation form of RAID. Although the embodiment of FIG. 18 has been described as an example with respect to the case where one spare disk unit is provided at the same rank, by providing two spare disk units at the same rank, when faults simultaneously occur in the two disk units at the same rank, the system can be instantaneously switched to the corresponding state of the request data.

Although the above embodiment has been described as an example with respect to the disk array in which the mirror disk units of four ports and four ranks are set to the component elements, the number of ports and the number of ranks can be properly decided as necessary. The invention, further, is not limited by the numerical values shown in the embodiments.

What is claimed is:

1. A disk array apparatus comprising:

disk array means in which a plurality of mirror disk means, each having a set of two disk units for storing same data, are arranged so that they can be accessed in parallel, control means for striping write data from a host computer, and thereafter writing said stripe data into said disk array means in parallel and for synthesizing data read out in parallel from said disk array means and transferring said synthesized data to a host computer:

a memory table for managing states of said plurality of disk units;

check circuit means for executing an access to said disk array means;

access judging means for judging whether an abnormality has occurred in said check circuit means or not;

abnormality number counting means for counting a number of abnormalities judged by said access judging means; and fault judging means for deciding a device fault when the number of abnormalities counted by said abnormality number counting means is equal to or larger than a predetermined threshold value and for registering fault information in a device management table means;

wherein said control means executes processes to said disk array means with reference to said memory table when there is an access request from said host computer.

2. An apparatus according to claim 1, wherein said memory table registers information indicating that one of said disk units provided for said mirror disk means is set into a disk unit for present use and the other is set into a disk unit for spare use, and said control means reads out data from said disk unit on the present use side of said mirror disk means with reference to said memory table at the time of a read access operation and writes data into both said disk unit for present use and said disk unit for spare use at the time of a write access operation.

3. An apparatus according to claim 2, wherein said disk array means has change-over control means for switching, such that in response to an instruction from said reading operation from said control means, said disk unit is switched to said disk unit on the present use side of said mirror disk means and the data is read out and, in response to an instruction from said write operation, said change over control means switches said disk unit so that data is written into both said disk unit for present use and said disk unit for spare use.

4. An apparatus according to claim 2, wherein said disk array means is constructed in a manner such that each of said two disk units constituting said mirror disk means are connected in parallel to said control means through an individual port, and said control means reads out data by accessing said disk unit on the present use side by one of the ports of the mirror disk means at the time of said read operation and writes the data by accessing both said disk unit for present use and said disk unit for spare use by both of the ports at said write operation.

5. An apparatus according to claim 4, wherein when there is a write request from said upper apparatus, said control means stripes the write data into the data of the number as many as the number of disk units which can be accessed in parallel in said mirror disk means and, after that, said control means forms the same data as each of said stripe data and transfers the pair of same stripe data to the two ports of the mirror disk means.

6. An apparatus according to claim 1, wherein said disk array means is constructed by:

a disk unit in which at least two disk modules are detachably built; and an apparatus casing which has a plurality of enclosing portions in which said plurality of disk units are installed in accordance with a predetermined array construction.

7. An apparatus according to claim 6, wherein said disk unit has a power source section and cooling means as common portions for said detachable disk modules.

8. An apparatus according to claim 6, wherein said disk module has at least a disk medium, a disk rotating mechanism, and a head mechanism.

9. An apparatus according to claim 6, wherein said disk unit has therein a circuit unit of change-over control means for switching in a manner such that the disk unit is switched to the disk unit on the present use side of said mirror disk means and the data is read out in response to an instruction of the reading operation from said control means and the data is written to both of the present use disk unit and the spare disk unit in response to an instruction of the writing operation.

10. An apparatus according to claim 6, wherein said disk array means is constructed in a manner such that the disk unit in which at least two disk modules are detachably built is installed into a disk array casing in which another disk unit having therein a single disk module of a different medium size will be enclosed and said disk unit is used as a component element of the mirror disk means.

11. An apparatus according to claim 1, further having preventive maintenance information storing means for holding preventive maintenance information formed in correspondence to the abnormality judgment of said access judging means into a state in which it can be recognized by said upper apparatus.

12. An apparatus according to claim 1, further having device check means for executing a false accessing operation to said disk array means in an idle state of said control means and for checking said state of each said disk unit.

13. An apparatus according to claim 12, wherein said device check means executes the writing operation using dummy data to a specific data region of said disk array means.

14. An apparatus according to claim 12, wherein each time said access judging means judges an abnormality by the false accessing operation to said disk array means, said device check means allows said abnormality number counting means to count the number of abnormality times, and in the case where said number of abnormality times is equal to or larger than a predetermined threshold value and said fault judging means decides the occurrence of the fault, fault information is registered into said device management table means.

15. An apparatus according to claim 1, further having preventive maintenance information storing means for holding preventive maintenance information corresponding to abnormality information judged by said access judging means by the false accessing operation by said device check means in a state in which said preventive maintenance information can be recognized by said upper apparatus.

16. An apparatus according to claim 1 or 14, wherein when the reading operation is executed, in the case where the fault disk unit is recognized with reference to the fault information of said device management table means, so long as said fault disk unit is the disk unit on the present use side, said control means switches the operation to the reading operation from the spare disk unit, and so long as the fault disk unit is the spare disk unit, said control means maintains the reading operation from the present use disk unit.

17. An apparatus according to claim 1 or 14, wherein when the writing operation is executed, in the case where the fault disk unit is recognized with reference to the fault information of said device management table means, said control means disconnects the fault disk unit from a target of the writing operation.

18. A disk array apparatus comprising:

disk array means in which a plurality of disk units are arranged so that they can be accessed in parallel;

control means for allocating at least one of the disk units which belong to a same rank of said disk array means to the disk unit for spare use, for allocating the other remaining plurality of disk units for data storage, for striping write data from a host computer, for writing said stripe data in parallel to said disk units for data storage, for synthesizing said data read out in parallel from the disk units for data storage, and for transferring said synthesized data to said host computer;

check circuit means for executing an access to said disk array means;

access judging means for judging whether an abnormality has occurred in said check circuit means or not;

abnormality number counting means for counting the number of abnormalities judged by said access judging means;

fault judging means for predictively judging that there is a possibility of the occurrence of a fault in near future when the number of abnormalities counted by said abnormality number counting means is equal to or larger than a predetermined threshold value that is smaller than a threshold value which is used in an ordinary fault judgement; and construction control means for selecting said spare disk unit at the time of the predictive judgement of said fault by said fault judging means, for copying the storage data of a faulty disk unit, for constructing mirror disk means by said faulty disk unit and said spare disk unit after completion of the copying operation, and for setting said operation to simultaneously write the data to both of said disk units and to read out the data from either one of the disk units into said control means.

19. An apparatus according to claim 18, wherein said construction control means sets said spare disk unit into a disk unit for present use and allows the data to be read out by said control means.

20. An apparatus according to claim 18, wherein said fault judging means has means for outputting and displaying a fact that the predictive judgement of the fault has been executed.

21. A disk array apparatus comprising:

a plurality of disk units each of which is constructed by two disk modules for storing same data, in which one mirror disk is constructed by said two disk modules;

an array controller for striping write data from a host computer and, thereafter writing said stripe data into said plurality of disk units in parallel, and for synthesizing data read out in parallel from said plurality of disk units and transferring said synthesized data to said host computer;

a memory table for managing states of said plurality of disk units;

a check circuit section for executing an access to said plurality of disk units;

an access judging circuit section for judging whether an abnormality has occurred in said check circuit section or not;

a counter for counting the number of abnormalities judged by said access judging circuit section; and a fault judging circuit section for deciding a device fault when the number of abnormalities counted by said counter is equal to or larger than a predetermined threshold value and for registering fault information into said memory table;

wherein said array controller executes processes to said plurality of disk units with reference to said memory table when there is an access request from said host computer.

22. An apparatus according to claim 21, wherein said memory table registers information indicating that one of the disk modules provided for the disk units is set into a disk module for present use and the other is set into a disk module for spare use, and said array controller reads out said data from the disk module on the present use side of said disk unit with reference to said memory table at the time of a read access operation and writes the data into both of the present use disk module and the spare use disk module at the time of a write access operation.

23. An apparatus according to claim 22, wherein each of said plurality of disk units has a change-over control circuit section for switching in a manner such that in response to the instruction of the reading operation from said array controller, the disk module is switched to the disk module on the present use side and the data is read out and, in response to the instruction of the writing operation, the data is written into both of the present use disk module and the spare disk module.

24. An apparatus according to claim 22, wherein each of said disk units is constructed in a manner such that each of the two built-in disk modules is connected in parallel to said array controller through an individual port, and said array controller reads out the data by accessing the disk module on the present use side by one of the ports at the time of the reading operation and writes the data by accessing both of the present use disk module and the spare disk module by both of the ports at the time of the writing operation.

25. An apparatus according to claim 24, wherein when there is a write request from said upper apparatus, said array controller stripes the write data into the data of the number as many as the number of disk units which can be accessed in parallel and, after that, said array controller forms the same data as each of said stripe data and transfers the pair of same stripe data to the two ports of each of said disk units.

26. An apparatus according to claim 21, further having a register circuit for holding preventive maintenance information formed in correspondence to the abnormality judgment of said access judging circuit section into a state in which it can be recognized by said upper apparatus.

27. A disk apparatus according to claim 21, wherein said array controller writes said stripe data into said plurality of disk units in parallel together with parity data.

28. A disk array apparatus comprising:

a plurality of disk modules arranged so that they can be accessed in parallel;

an array controller for allocating at least one of said disk modules which belong to a same rank in said plurality of disk modules for spare, for allocating said other plurality of disk modules for data storage, for striping write data from a host computer, for writing said stripe data in parallel to said disk modules for data storage, for synthesizing data read out in parallel from said disk modules for data storage, and for transferring said synthesized data to said host computer;

a check circuit section for executing an access to said plurality of disk modules;

an access judging circuit section for judging whether an abnormality has occurred in said check circuit section or not;

a counter for counting the number of abnormalities judged by said access judging circuit section;

a fault judging circuit section for predictively judging a possibility of an occurrence of a fault in near future when the number of abnormalities counted by said counter is equal to or larger than a predetermined threshold value that is smaller than a threshold value which is used in an ordinary fault judgement; and a construction control circuit section for selecting said spare disk module at the time of the predictive judgement of said fault by said fault judging circuit section, for copying storage data of a faulty disk module, for constructing a mirror disk unit by said faulty disk module and said spare disk module after completion of the copying operation, and for setting the operation to simultaneously write the data to both of said disk modules and read out the data from either one of said disk modules into said array controller.

* * * * *